United States Patent [19]

Shinoaki et al.

[11] Patent Number: 5,535,316
[45] Date of Patent: Jul. 9, 1996

[54] COMPUTER PROGRAM PRODUCT FOR SEARCHING LINE DATA IN GRAPHIC DATA BASE SYSTEM

[75] Inventors: Sakura Shinoaki, Fujisawa; Hiroto Sato; Kyozo Tanaka, both of Tokyo, all of Japan

[73] Assignee: Tokyo Gas Co., Ltd., Tokyo, Japan

[21] Appl. No.: 538,227

[22] Filed: Oct. 3, 1995

Related U.S. Application Data

[62] Division of Ser. No. 19,707, Feb. 19, 1993.

[30] Foreign Application Priority Data

Feb. 24, 1992 [JP] Japan .................................. 4-72953

[51] Int. Cl.⁶ .................................................. G06T 15/00
[52] U.S. Cl. ........................... 395/134; 395/133; 395/143
[58] Field of Search .......................... 395/119–122, 133, 395/134, 135, 141, 142, 143, 162, 164, 165, 166

[56] References Cited

U.S. PATENT DOCUMENTS

| | | | |
|---|---|---|---|
| 4,958,305 | 9/1990 | Piazza | 364/522 |
| 5,195,177 | 3/1993 | Kamiyama et al. | 395/134 |
| 5,287,440 | 2/1994 | Yamaashi et al. | 395/134 |
| 5,369,741 | 11/1994 | Hartog et al. | 395/134 X |

FOREIGN PATENT DOCUMENTS

| | | |
|---|---|---|
| 0360459 | 3/1990 | European Pat. Off. . |
| 5-46777 (A) | 2/1993 | Japan . |
| 2227148 | 7/1990 | United Kingdom . |

OTHER PUBLICATIONS

Foley et al., *Computer Graphics Principles ad Practice*, pp. 110–117, 1990.

*Displays, Technology and Application*, vol. 8, No. 2, Apr. 1987, UK, pp. 87–97.

*Digital Mapping* directed by the Geographical Survey Institute of Japan, published by Kajima Institute Publishing Co., Ltd., 1991.

*System Modelling and Optimization*, Proceedings of the 15th IFIP Conference Zurich, Switzerland, Sep. 2–6, 1991.

*Computer Mapping: Urban Utilities Information Management for the 21st Century*, Sakura Shinoski (Manager, Pipeline Engineering Group, Tokyo Gas Co., Ltd.).

Primary Examiner—Almis R. Jankus
Attorney, Agent, or Firm—Sterne, Kessler, Goldstein & Fox

[57] ABSTRACT

A computer program product for searching line data to be transmitted to a terminal which demands an output map. The line data is obtained by selecting line segments within an output domain from the entire line data included in an object map read from a graphic file. The selection of the line segments is performed by obtaining the coordinates of intersections of lines specifying the output domain and line segment specified by any two adjacent characteristic points on a line associated with line data read out from the graphic file, and then by arranging the intersections and the characteristic points within the output domain sequentially along the line. This makes it possible to shorten the response time between a demand from the terminal and the actual output of the line data within the output domain to that terminal.

1 Claim, 22 Drawing Sheets

SOLID LINE : ROAD BOUNDARIES
BROKEN LINE : GAS PIPES
▷◁ : VALVES

| POINT | COORDI-NATES | | LINE TYPE TAG T | INSIDE/OUTSIDE FLAG F |
|---|---|---|---|---|
| $P_1$ | $x_1$ | $y_1$ | 1 | 0 |
| $P_2$ | $x_2$ | $y_2$ | 1 | 1 |
| $P_3$ | $x_3$ | $y_3$ | 1 | 1 |
| $P_4$ | $x_4$ | $y_4$ | 1 | 1 |
| $P_5$ | $x_5$ | $y_5$ | 1 | 0 |
| $P_6$ | $x_6$ | $y_6$ | 1 | 0 |
| $P_7$ | $x_7$ | $y_7$ | 1 | 0 |
| $P_8$ | $x_8$ | $y_8$ | 1 | 0 |
| $P_9$ | $x_9$ | $y_9$ | 1 | 1 |
| $P_{10}$ | $x_{10}$ | $y_{10}$ | 1 | 1 |
| $P_{11}$ | $x_{11}$ | $y_{11}$ | 1 | 1 |
| $P_{12}$ | $x_{12}$ | $y_{12}$ | 5 | 0 |

$P_2$–$P_4$: CHARACTERISTIC POINTS INSIDE THE OUTPUT DOMAIN $P_5$–$P_8$: CHARACTERISTIC POINTS OUTSIDE THE OUTPUT DOMAIN

FIG. 16

| POINT | COORDI-NATES | | LINE TYPE TAG T | INSIDE/ OUTSIDE FLAG F | NOTES | |
|---|---|---|---|---|---|---|
| | | | | | i | j |
| $P_1$ | $x_1$ | $y_1$ | 1 | 0 | 1 | 1 |
| $P'_1$ | $x'_1$ | $y'_1$ | | 2 | 1 | 2 |
| $P_2$ | $x_2$ | $y_2$ | 1 | 1 | 2 | 3 |
| $P_3$ | $x_3$ | $y_3$ | 1 | 1 | 3 | 4 |
| $P_4$ | $x_4$ | $y_4$ | 1 | 1 | 4 | 5 |
| $P'_4$ | $x'_4$ | $y'_4$ | | 2 | 4 | 6 |
| $P_5$ | $x_5$ | $y_5$ | 1 | 0 | 5 | 7 |
| $P_6$ | $x_6$ | $y_6$ | 1 | 0 | 6 | 8 |
| $P_7$ | $x_7$ | $y_7$ | 1 | 0 | 7 | 9 |
| $P_8$ | $x_8$ | $y_8$ | 1 | 0 | 8 | 10 |
| $P'_8$ | $x'_8$ | $y'_8$ | | 2 | 8 | 11 |
| $P_9$ | $x_9$ | $y_9$ | 1 | 1 | 9 | 12 |
| $P_{10}$ | $x_{10}$ | $y_{10}$ | 1 | 1 | 10 | 13 |
| $P_{11}$ | $x_{11}$ | $y_{11}$ | 1 | 1 | 11 | 14 |
| $P'_{11}$ | $x'_{11}$ | $y'_{11}$ | | 2 | 11 | 15 |
| $P_{12}$ | $x_{12}$ | $y_{12}$ | 5 | 0 | 12(=N) | 16(=M) |

FIG.17

| POINT | COORDI-NATES | | LINE TYPE TAG $T_i$ | INSIDE/OUTSIDE FLAG $F_i$ |
|---|---|---|---|---|
| $P_1$ | $x_1$ | $y_1$ | 1 | 0 |
| $P_2$ | $x_2$ | $y_2$ | 1 | 1 |
| $P_3$ | $x_3$ | $y_3$ | 1 | 1 |
| $P_4$ | $x_4$ | $y_4$ | 1 | 1 |
| $P_5$ | $x_5$ | $y_5$ | 1 | 0 |
| $P_6$ | $x_6$ | $y_6$ | 1 | 0 |
| $P_7$ | $x_7$ | $y_7$ | 1 | 0 |
| $P_8$ | $x_8$ | $y_8$ | 1 | 0 |
| $P_9$ | $x_9$ | $y_9$ | 1 | 1 |
| $P_{10}$ | $x_{10}$ | $y_{10}$ | 1 | 1 |
| $P_{11}$ | $x_{11}$ | $y_{11}$ | 1 | 1 |
| $P_{12}$ | $x_{12}$ | $y_{12}$ | 1 | 0 |
| $P_{13}$ | $x_{13}$ | $y_{13}$ | 1 | 0 |
| $P_{14}$ | $x_{14}$ | $y_{14}$ | 1 | 1 |
| $P_{15}$ | $x_{15}$ | $y_{15}$ | 1 | 1 |
| $P_{16}$ | $x_{16}$ | $y_{16}$ | 1 | 0 |
| $P_{17}$ | $x_{17}$ | $y_{17}$ | 1 | 0 |
| $P_{18}$ | $x_{18}$ | $y_{18}$ | 5 | 0 |

FIG. 21

| POINT | COORDI-NATES | | LINE TYPE TAG T | NOTES |
|---|---|---|---|---|
| | | | | K |
| $P_1$ | $x_1$ | $y_1$ | 1 | 1 |
| $P_2$ | $x_2$ | $y_2$ | 1 | 2 |
| $P_3$ | $x_3$ | $y_3$ | 1 | 3 |
| $P_4$ | $x_4$ | $y_4$ | 1 | 4 |
| $P_5$ | $x_5$ | $y_5$ | 1 | 5 |
| $P_8$ | $x_8$ | $y_8$ | 1 | 6 |
| $P_9$ | $x_9$ | $y_9$ | 1 | 7 |
| $P_{10}$ | $x_{10}$ | $y_{10}$ | 1 | 8 |
| $P_{11}$ | $x_{11}$ | $y_{11}$ | 1 | 9 |
| $P_{12}$ | $x_{12}$ | $y_{12}$ | 1 | 10 |
| $P_{13}$ | $x_{13}$ | $y_{13}$ | 1 | 11 |
| $P_{14}$ | $x_{14}$ | $y_{14}$ | 1 | 12 |
| $P_{15}$ | $x_{15}$ | $y_{15}$ | 1 | 13 |
| $P_{16}$ | $x_{16}$ | $y_{16}$ | 5 | 14 |

FIG.22

COMPUTER PROGRAM PRODUCT FOR SEARCHING LINE DATA IN GRAPHIC DATA BASE SYSTEM

This application is a division of application Ser. No. 08/019,707, filed Feb. 19. 1993, (status: pending).

BACKGROUND OF THE INVENTION

1. Field of the Invention

The present invention relates to a method and apparatus for searching line data in a graphic data base system.

2. Description of the Related Art

Recently, computer mapping systems have been extensively used to retrieve graphic data of a desired area, and to display a map of that area based on the graphic data in response to access to a graphic data base system from a terminal. The graphic data base system is built by representing each line or graphic element on a map in the form of line data, and by storing the line data into a file. Here, the line data usually consists of sequentially arranged coordinates of characteristic points on a line.

Such computer mapping systems have already been used in the fields of public facility management systems, road management systems, housing management systems, administrative management systems or the like. Thus, the graphic data base systems have been built with regard to maps representing the state of burial facilities such as gas pipeline networks, water pipes, communication lines, power lines or the like, and with regard to road maps and maps representing the state of allocation of real estate.

FIG. 1 is a block diagram illustrating a general computer mapping system. In this figure, reference numeral 70 designates a host computer; 71, a large capacity disk storage containing a graphic data base; 72, another large capacity disk storage comprising a work area 72b and an area for storing an application program 72a executing the input, searching or the like of the line data; 73, an attribution data input portion; 74, a display portion for confirming the input of the line data; 75, a digitizer for inputting the coordinates of each characteristic point on each line to be inputted; 76, a terminal used for searching and outputting the line data; and 77, a plotter for printing on recording paper a displayed map.

The line data comprises coordinate data and attribution data (that is, line type tag). The coordinate data is inputted by sequentially designating the characteristic points on a line, which is a graphic element, on a map which is set on the digitizer 75. The attribution data is obtained by designating the type of a line segment, such as a solid line, a broken line, straight line or a semicircle, between two adjacent characteristic points by the attribution data input portion 73. The attribution data may be omitted when the entire lines to be inputted are represented by a single type of a line such as a solid straight line.

FIG. 2 illustrates a line data format cited from page 44 of "Digital Mapping", directed by the Geographical Survey Institute of Japan, and published by Kajima Institute Publishing Co., LTD., 1991. The line data format comprises a header 81 followed by a data area 82. Each sector of the data area 82 includes three kinds of data: the x-coordinate and y-coordinate of each characteristic point stored in the first and second portions of the sector, and a line type tag as the attribution data stored in the third portion.

Since the area to be handled by the graphic data base system is very broad such as Tokyo, the area is usually divided into many rectangular unit areas, each of which is represented by a piece of map. For example, the unit area is defined as a rectangular area 2 km from east to west by 1.5 km from north to south, that is, the map of a unit area is 80 cm×60 cm on a national large scale map of Japan whose reduced scale is 1/2500.

The line data of such maps are generally stored in the disk storage 71 on the block basis. Each of the blocks contains the line data of each one map. Each map has a map number which is used as a key for searching the map.

FIG. 3 illustrates an example of the map which is accessed from the terminal 76. When the host computer 70 issues a command demanding the output of the map 85 by using a street name or the like as a key, a rectangular output domain 86 is set in the object map 85 (the object map here refers to a map which is retrieved from the file, and whose portion or portions are outputted from the terminal 76). The application program 72a reads the line data group stored in a block of the graphic file associated with the number of the map 85 from the disk storage 71, that is, reads the entire line data of the line data group associated with the object map 85 including those of the output domain 86, and transmits the line data group to the terminal 76. When the terminal 6 receives the line data group, it selects only the line data necessary to output the output domain 86. Incidentally, the term "rectangle" includes a square in this specification.

Thus, even if only a part of the line data of the object map 85 is demanded from the terminal 76, the host computer 70 in the conventional system must transmit the entire line data associated with the object map 85. In other words, line data unnecessary for outputting the output domain 86 is transmitted to the demanding terminal 76 through a communication line, and the terminal 76 selects the line data necessary for outputting the output domain 86. As a result, the response time from the demand to the output of the output domain 86 is lengthened. To overcome this problem, an expensive serial line of 64 kbps must be used instead of an inexpensive serial line of 9.6 kbps, for example. In addition, the terminal must temporarily store the line data unnecessary for outputting the output domain, which requires a large capacity storage in the terminal 76.

For example, let us suppose that an area of 20 cm×15 cm is selected from the 80 cm×60 cm map of a unit area of 2 km×1.5 km on the national large scale map of Japan whose reduced scale is 1/2500 so that the selected area is to be displayed on a screen without reduction. In this case, if the line density is uniform, the line data as much as 16 times the necessary amount for outputting the area of interest (that is, (80 cm×60 cm)/(20 cm×15 cm)) must be transmitted from the host computer 70 to the terminal 76.

SUMMARY OF THE INVENTION

It is therefore an object of the present invention to provide a method and apparatus for searching line data in a graphic data base system, which can shorten the response time from a demand to the output of the map, and can decrease the capacity of the storage of the terminal.

In a first aspect of the present invention, there is provided a method for searching line data in a graphic data base system comprising the steps of:

(a) reading first line data associated with each line included in an object map from a graphic file as second line data, each of the first line data being formed by arranging coordinates of characteristic points on a continuous line sequentially along the line, and by storing the arranged coordinates in the graphic file;

(b) storing coordinates of setting points defining an output domain which is arbitrary set in the object map;

(c) obtaining, for each of the second line data, maximum values and minimum values of the characteristic points constituting the second line data, each the maximum value and minimum value being obtained for each coordinate axis of the coordinates;

(d) comparing each of the maximum values and minimum values with the coordinates of the setting points;

(e) determining for each line represented by the second line data whether there is a possibility that at least a part of the line can be included in the output domain on the basis of results of the step (d), and selecting the second line data associated with the line as third line data only when there is the possibility; and (f) transmitting the third line data to an external terminal.

The axes of the coordinates may be x-coordinate axis and y-coordinate axis, the output domain may be a rectangle whose diagonal vertices are $(x_A, y_A)$ and $(x_B, y_B)$ where $x_A<x_B$ and $y_A< y_B$, and the maximum values may be $x_{max}$ and $y_{max}$ and the minimum values may be $x_{min}$ and $y_{min}$, and wherein the step (e) may determine that there is the possibility that at least a part of the line represented by the second line data can be included in the output domain when the following conditions are simultaneously satisfied.

$x_{max}>x_A$, $x_{min}<x_B$, $y_{max}>y_A$, and $y_{min}<y_B$.

The step (c) may further comprise a step of forming new second line data by affixing the maximum values and minimum values to the second line data.

In a second aspect of the present invention, there is provided a method for searching line data in a graphic data base system comprising the steps of:

(a) reading first line data associated with each line included in an object map from a graphic file as second line data, each of the first line data being formed by arranging coordinates of characteristic points on a continuous line sequentially along the line, and by storing the arranged coordinates in the graphic file;

(b) storing coordinates of setting points defining an output domain which is arbitrary set in the object map;

(c) obtaining, for each line associated with the second line data, characteristic points which are included in the output domain;

(d) obtaining coordinates of an intersection of each line specifying the output domain and a line segment specified by two adjacent characteristic points on a line including at least one characteristic point inside the output domain;

(e) forming, for each line including at least one the characteristic point inside the output domain or at least one the intersection, third line data by arranging coordinates of the intersection and the coordinates of the characteristic point inside the output domain sequentially along the line; and (f) transmitting the third line data to an external terminal.

The third line data including coordinates of two adjacent first and second intersections may be provided with a jump tag which is affixed to the coordinates of the first intersection to indicate that no line segment is present between the first and second intersections.

The output domain may be a rectangle.

The step (c) may further set for each of the characteristic point a flag indicating whether each of the characteristic points is located inside or outside the output domain, and the step (d) may obtain the intersection when the two adjacent points at the ends of the line segment are located at different sides of the output domain.

In a third aspect of the present invention, there is provided a method for searching line data in a graphic data base system comprising the steps of:

(a) reading first line data associated with each line included in an object map from a graphic file as second line data, each of the first line data being formed by arranging coordinates of characteristic points on a continuous line sequentially along the line, and by storing the arranged coordinates in the graphic file;

(b) storing coordinates of setting points defining an output domain which is arbitrary set in the object map;

(c) setting, for each characteristic point on each line associated with the second line data, a flag indicating whether the characteristic point is inside or outside the output domain;

(d) testing each characteristic point on each line associated with the second line date whether the characteristic point is to be transmitted to an external terminal or not, and selecting the characteristic point to be transmitted to the external terminal if the characteristic point itself is inside the output domain, or if the characteristic point is immediately joined to a characteristic point inside the output domain;

(e) forming, for each line including at least one the characteristic point inside the output domain, third line data by arranging coordinates of the characteristic points selected at step (d) sequentially along the line; and (f) transmitting the third line data to the external terminal.

In a fourth aspect of the present invention, there is provided an apparatus for searching line data in a graphic data base system comprising:

(a) means for reading first line data associated with each line included in an object map from a graphic file as second line data, each of the first line data being formed by arranging coordinates of characteristic points on a continuous line sequentially along the line, and by storing the arranged coordinates in the graphic file;

(b) means for storing coordinates of setting points defining an output domain which is arbitrary set in the object map;

(c) means for obtaining, for each of the second line data, maximum values and minimum values of the characteristic points constituting the second line data, each the maximum value and minimum value being obtained for each coordinate axis of the coordinates;

(d) means for comparing each of the maximum values and minimum values with the coordinates of the setting points;

(e) means for determining for each line represented by the second line data whether there is a possibility that at least a part of the line can be included in the output domain on the basis of results of the comparing by the means (d), and selecting the second line data associated with the line as third line data only when there is the possibility; and (f) means for transmitting the third line data to an external terminal.

In a fifth aspect of the present invention, there is provided an apparatus for searching line data in a graphic data base system comprising:

(a) means for reading first line data associated with each line included in an object map from a graphic file as second line data, each of the first line data being formed by arranging coordinates of characteristic points on a continuous line sequentially along the line, and by storing the arranged coordinates in the graphic file;

(b) means for storing coordinates of setting points defining an output domain which is arbitrary set in the object map;

(c) means for obtaining, for each line associated with the second line data, characteristic points which are included in the output domain;

(d) means for obtaining coordinates of an intersection of each line specifying the output domain and a line segment specified by two adjacent characteristic points on a line including at least one characteristic point inside the output domain;

(e) means for forming, for each line including at least one the characteristic point inside the output domain or at least one the intersection, third line data by arranging coordinates of the intersection and the coordinates of the characteristic point inside the output domain sequentially along the line; and (f) means for transmitting the third line data to an external terminal.

In a sixth aspect of the present invention, there is provided an apparatus for searching line data in a graphic data base system comprising:

(a) means for reading first line data associated with each line included in an object map from a graphic file as second line data, each of the first line data being formed by arranging coordinates of characteristic points on a continuous line sequentially along the line, and by storing the arranged coordinates in the graphic file;

(b) means for storing coordinates of setting points defining an output domain which is arbitrary set in the object map;

(c) means for setting, for each characteristic point on each line associated with the second line data, a flag indicating whether the characteristic point is inside or outside the output domain;

(d) means for testing each characteristic point on each line associated with the second line date whether the characteristic point is to be transmitted to an external terminal or not, and selecting the characteristic point to be transmitted to the external terminal if the characteristic point itself is inside the output domain, or if the characteristic point is immediately joined to a characteristic point inside the output domain;

(e) means for forming, for each line including at least one the characteristic point inside the output domain, third line data by arranging coordinates of the characteristic points selected by the means (d) sequentially along the line; and (f) means for transmitting the third line data to the external terminal.

According to the first and fourth aspects of the present invention, a host computer which executes the above-mentioned steps or which functions as the above-mentioned means with the application program, receives a demand for outputting a partial area (output domain) of a map from the terminal, and transmits the line data having a possibility that at least a part of the line associated with that line data may be included in the output domain. In other words, the host computer removes the line data having no possibility to be used for outputting the partial area, and then transmits only the selected line data to the terminal.

According to the second and fifth aspects of the present invention, only the line data associated with the line segments inside the output domain (partial area) is selected from the entire line data of the map, and is transmitted to the terminal.

According to the third and sixth aspects of the present invention, only the line data associated with the characteristic points which are inside the output domain or which are immediately next to the characteristic points inside the output domain (partial area) is selected from the entire line data of the map, and is transmitted to the terminal.

The above and other objects, effects, features and advantages of the present invention will become more apparent from the following description of the embodiments thereof taken in conjunction with the accompanying drawings.

BRIEF DESCRIPTION OF THE DRAWINGS

FIG. 16 is a diagram illustrating the line data when the process of FIG. 13 is completed;

FIG. 17 is a diagram illustrating the line data when the process of FIG. 14 is completed;

FIG. 21 is a diagram illustrating the line data to be processed by the third embodiment; and FIG. 22 is a diagram illustrating the line data to be transmitted to a terminal, when the process of FIG. 20 is completed.

DETAILED DESCRIPTION OF PREFERRED EMBODIMENTS

The invention will now be described with reference to the accompanying drawings.

EMBODIMENT 1

Before explaining the details of a first embodiment in accordance with the present invention, the principle thereof will be described.

Figure 4:
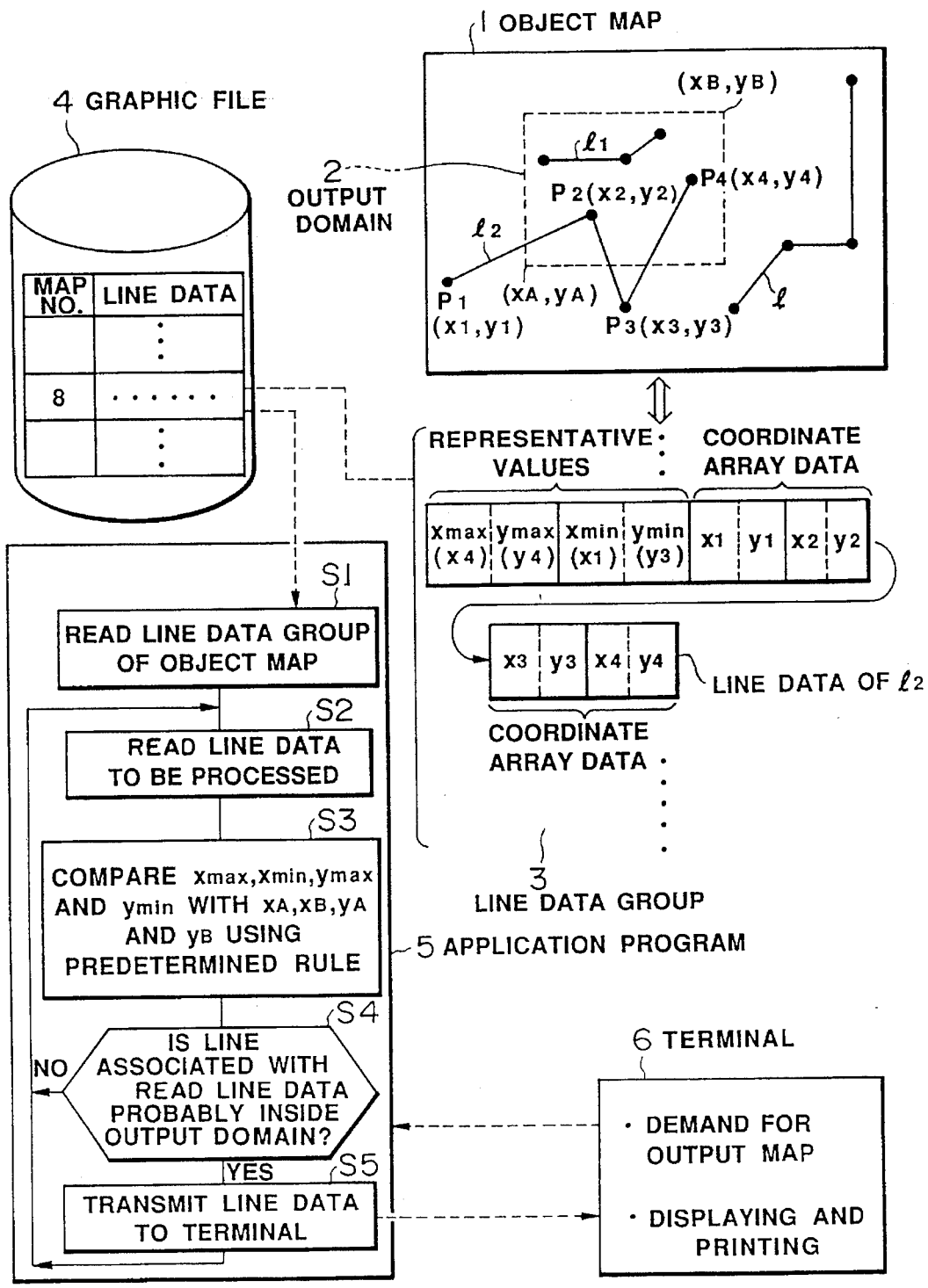
FIG. 4 is a block diagram showing the principle of a first embodiment of a method and apparatus for searching line data in a graphic data base system in accordance with the present invention.

FIG. 4 shows the principle of the first embodiment. In this figure, an object map 1 is identified by its number or address information entered from a terminal by an operator. An output domain 2 is also designated by the operator who enters more detailed address information into a terminal, or who sets a rectangular domain arbitrarily on the object map 1 displayed on the screen of the terminal. In this case, supplementary figures providing information on facility management or the like are not included in the map.

A line data group 3 is formed for all lines $l_1, l_2, l_3, \ldots$ in the object map 1. Each line data of the line data group 3 includes representative values followed by a coordinate data array. The representative values are the maximum and minimum values of the coordinate data array associated with each line, and is obtained for each coordinate axis. The coordinate data array is formed by arranging coordinates of characteristic points on each line sequentially along the line. The entire line data of each line data group associated with a map is stored in each one block of a graphic file 4. Thus, the graphic file 4 stores the line data group 3 for each map individually.

An application program 5 builds the graphic file 4 consisting of the line data, selects the line data that can probably be contained in the output domain 2 from the line data group 3 read from the graphic file 4, and transmits only the selected line data to a terminal 6.

The terminal 6 is provided for the purpose of requiring desired data and outputting a desired map. It issues to a host computer a command which designates the number of a desired map and the output domain 2, arranges the output map based on the received line data, and displays or prints the output map.

The rectangular output domain 2 is defined by the bottom left vertex $(x_A, y_A)$ and the top right vertex $(x_B, y_B)$, and the maximum value and the minimum value of the line $l_2$ along the x-coordinate are $x_4$ and $x_1$, and those along the y-coordinate are $y_4$ and $y_3$. The four values are referred to as representative values of the line data associated with the line $l_2$.

The application program 5 carries out the following steps to meet the demand of the terminal for outputting a desired map.

STEP S1: The application program 5 reads out the entire line data of the line data group 3 of the designated object map 1 from the graphic file 4, and proceeds to the next step.

STEP S2: The application program 5 retrieves the next line data to be processed from the line data group 3, and proceeds to the next step.

STEP S3: The application program 5 obtains representative values, that is, the maximum values and minimum values of the line data for respective coordinate axes (for example, $x_4, y_4, x_1, y_3$), and the coordinates of the setting points of the output domain 2 (for example, $x_A, y_A, x_B, y_B$), and then compares the representative values and the coordinates of the setting points in a predetermined manner. After that, it proceeds to the next step.

STEP S4: The application program 5 tests to determine whether at least a part of the line associated with the line data can probably be contained in the output domain 2. For example, it determines whether or not the conditions $x_{max} > x_A$, $x_{min} < x_B$, $y_{max} > y_A$ and $y_{min} < y_B$ are simultaneously met, and proceeds to the next step if the conditions are satisfied, and returns to step S2 if the conditions are not satisfied.

STEP S5: The application program 5 transmits the line data that satisfies the conditions of step S4 to the terminal 6, and returns to step S2.

Thus, the line data needed for outputting the line segments in the output domain 2 is selected from the line data group 3 retrieved from the graphic file 4.

More specifically, the graphic elements in a designated object map 1 consisting of many lines $l_1, l_2, l_3, \ldots$ are divided into three classes in terms of the relative positions to the output domain 2: lines which are entirely included in the output domain 2 like the line $l_1$; lines which are partially included in the output domain 2 like the line $l_2$; and lines which are entirely outside the output domain 2 like the line $l_3$. In this embodiment, the line data associated with the lines $l_1$ and $l_2$ are selected, whereas the line data associated with the line $l_3$ are removed.

The method for selecting the line data is not restricted to the above-described method wherein the representative values, that is, the maximum values and minimum values $(x_4, x_1, y_4, y_3)$ of the respective coordinate axes are compared with the coordinates $(x_A, y_A, x_B, y_B)$ of the setting points of the output domain 2 in order to determine whether the conditions $x_{max} > x_A$, $x_{min} < x_B$, $y_{max} > y_A$ and $y_{min} < y_B$ are satisfied. For example, when the output domain is located at a corner of the object map 1 as designated by reference numeral 21 of FIG. 5, the conditions $x_{min} < x_B$ and $y_{max} > y_A$ can be employed as a criterion of determining whether the line $l_6$ is included in the output domain 21.

Figure 5:
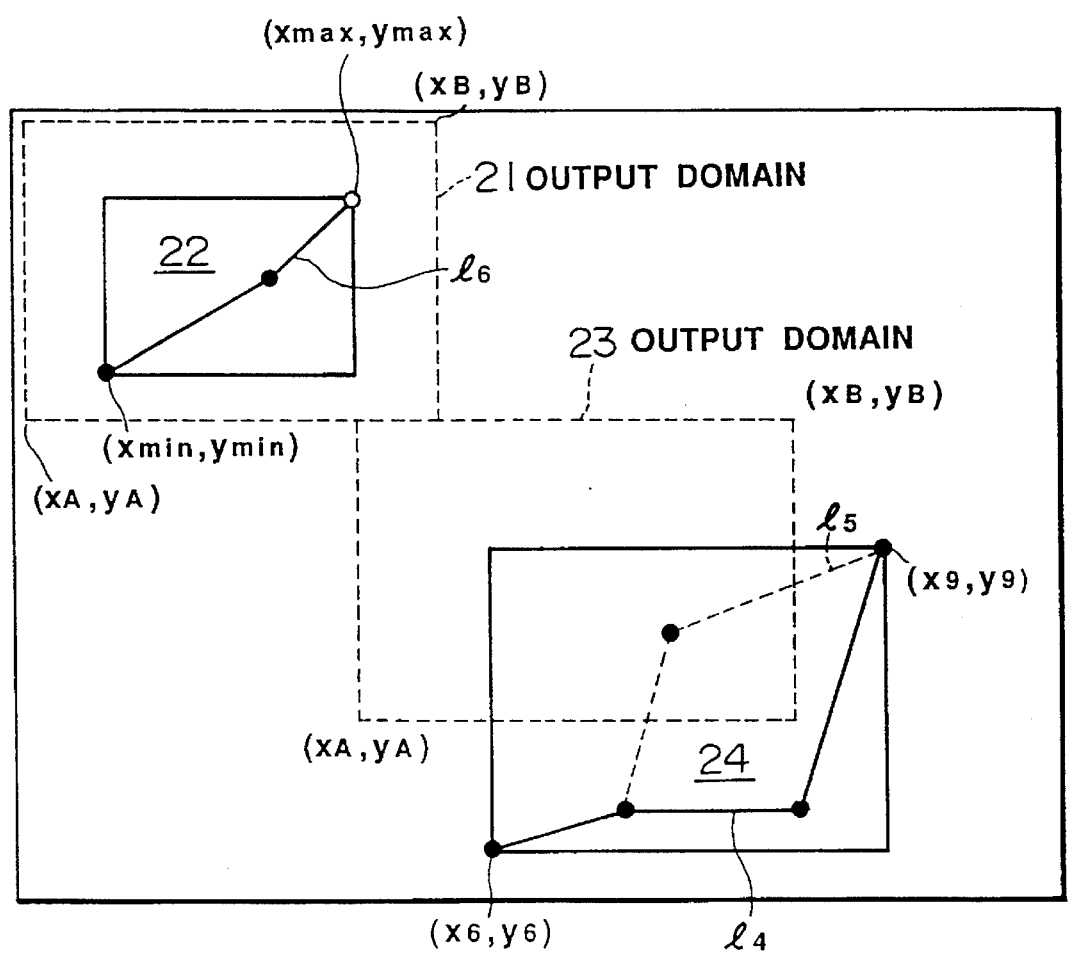
FIG. 5 is a diagram illustrating the relationship between the output domains and rectangular areas 22 and 24 configured by representative values (maximum and minimum values) of each line data of the first embodiment.

In FIG. 5, a line $l_4$ is entirely outside the output domain 23, and a line $l_5$ is partially included in the output domain 23, although the two lines $l_4$ and $l_5$ have common maximum values and minimum values $(x_9, x_6, y_6, y_6)$ for respective coordinate axes. In such a case, the application program 5 selects both line data associated with the lines so as to be sent to the terminal. In other words, the application program 5 does not discriminate the line $l_4$ which is located completely outside the output domain 23 from the line $l_5$ which in part is contained in the output domain 23. Thus, this embodiment tests to determine only a possibility whether at least a part of the line associated with a line data can be contained in the output domain.

In summary, the selection method described above checks whether the rectangular area formed by the representative values of each line data can overlap with the output domain. For example, with regard to the lines $l_4$ and $l_5$, the method checks whether a rectangular area 24 overlaps the output domain 23, and with regard to the line $l_6$, whether a rectangular area 22 overlaps the output domain 21.

The embodiment will now be described in more detail referring to FIGS. 6–9.

Figure 6:
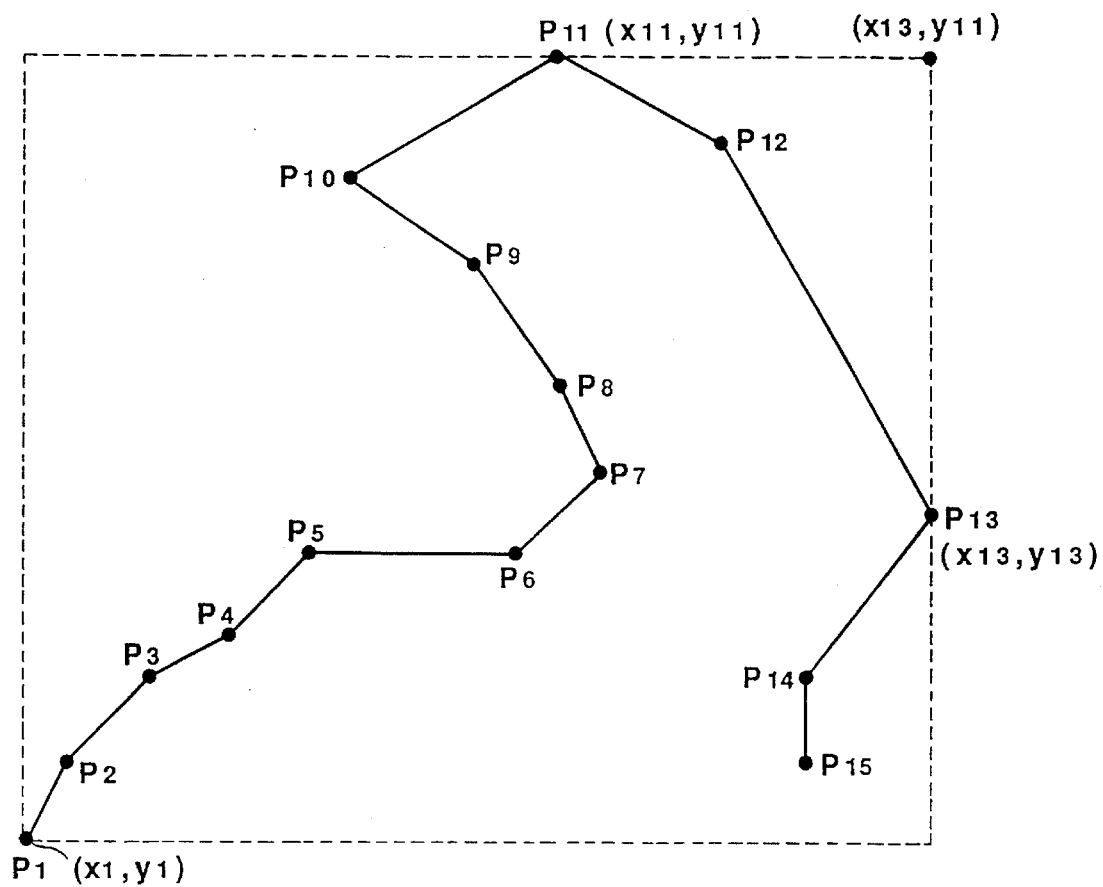
FIG. 6 is a diagram illustrating the relationship between a line as a graphic element and its representative values $x_1$, $y_1$ $x_{13}$ and $y_{11}$ in the first embodiment.

FIG. 6 is a diagram illustrating the relationship between a line as a graphic element and its representative values. The line data of the line consists of a coordinate data array formed by sequentially arranging the x- and y-coordinates of characteristic points $P_1$–$P_{15}$ and their representative values which are the maximum values and minimum values of the coordinates of the characteristic points. In this case, the representative values are the x- and y-coordinates $x_1$ and $y_1$ of the point $P_1$ as the minimum values, and the x-coordinate $x_{13}$ of the point $P_{13}$ and y-coordinate $y_{11}$ of the point $P_{11}$ as the maximum values.

Figure 7:
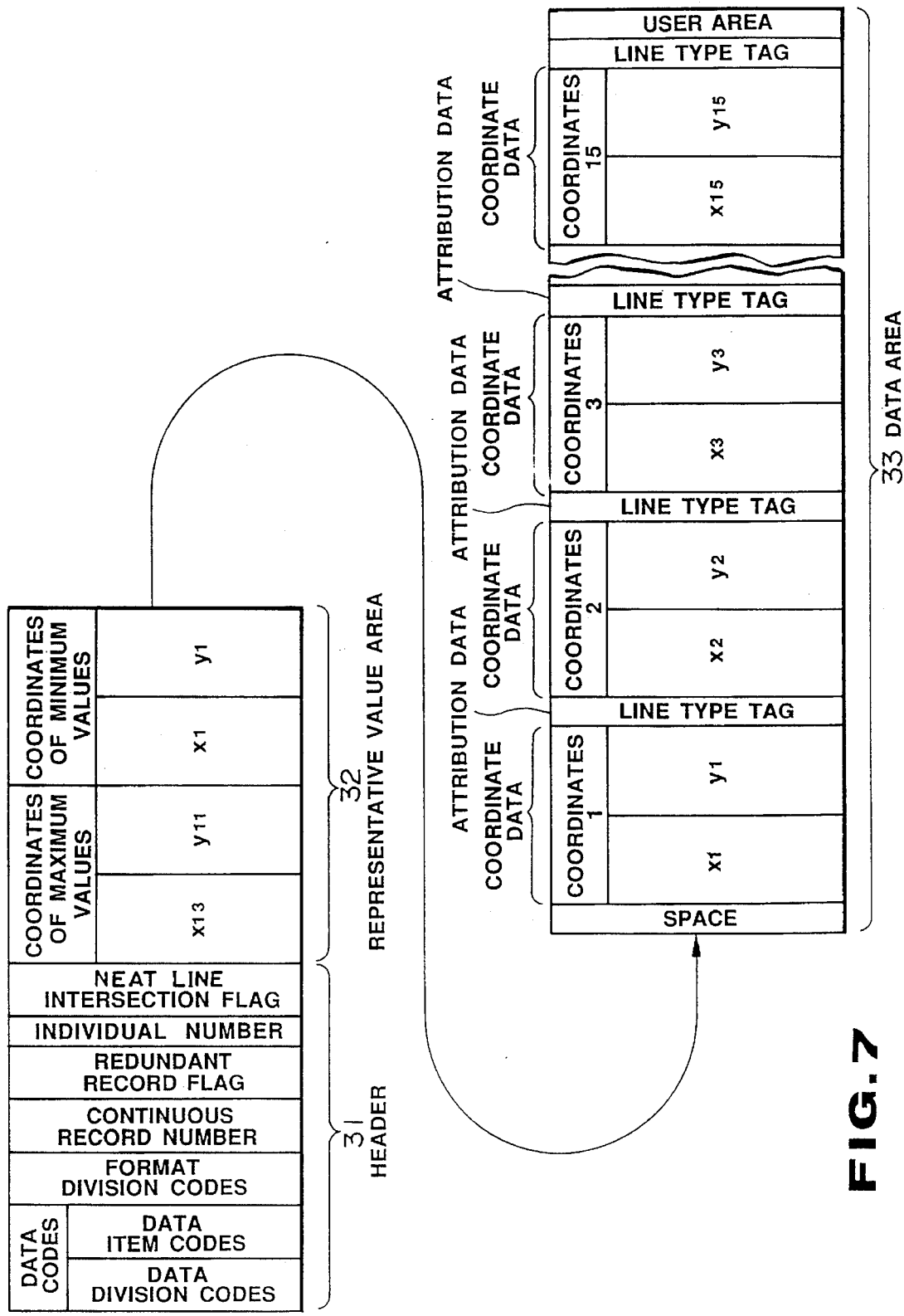
FIG. 7 is a diagram illustrating an example of a data format of line data used by the first and second embodiments.

FIG. 7 is a diagram illustrating an example of a line data format of the present invention.

Figure 1:
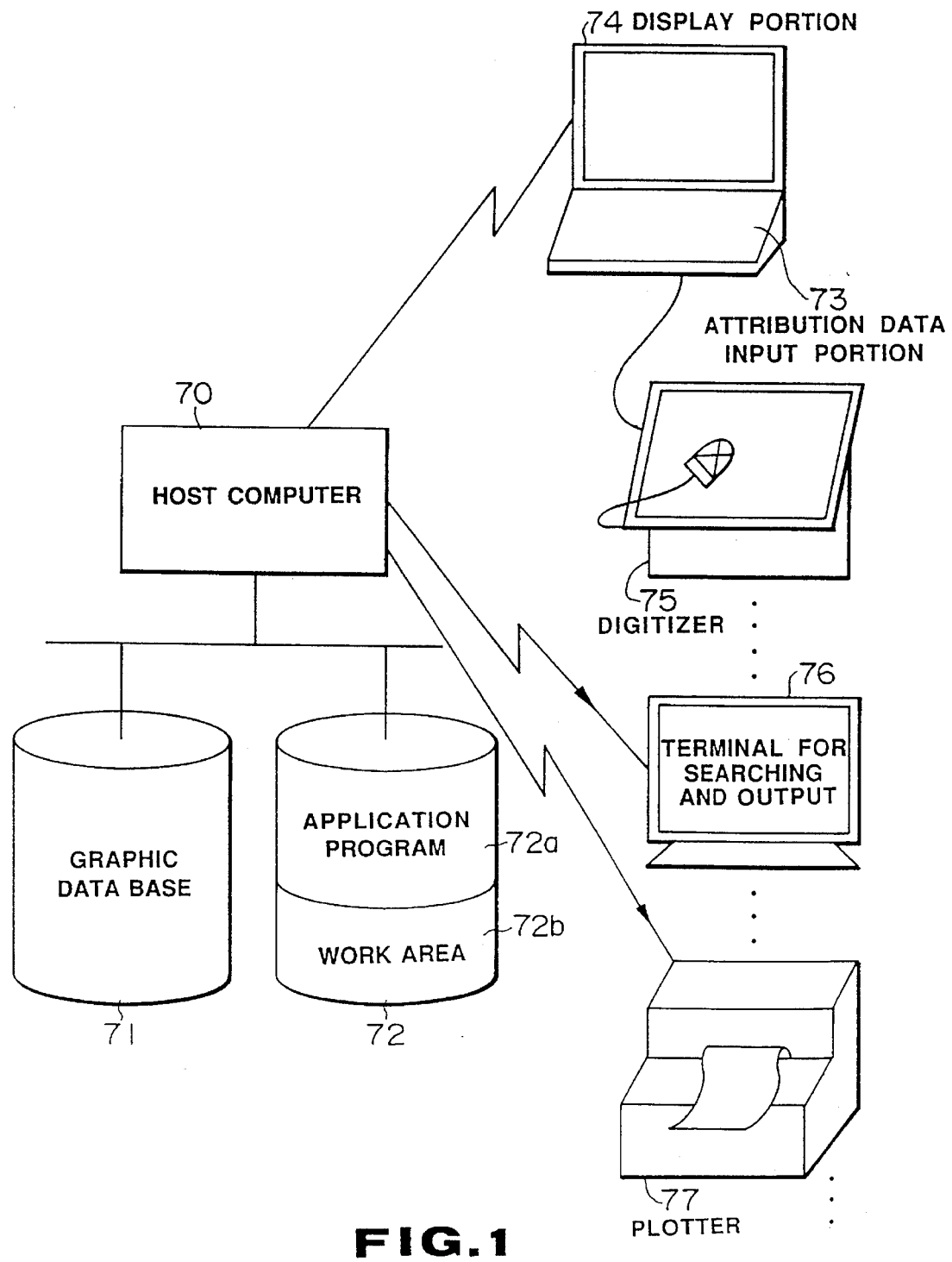
FIG. 1 is a block diagram showing a general computer mapping system.
Figure 2:
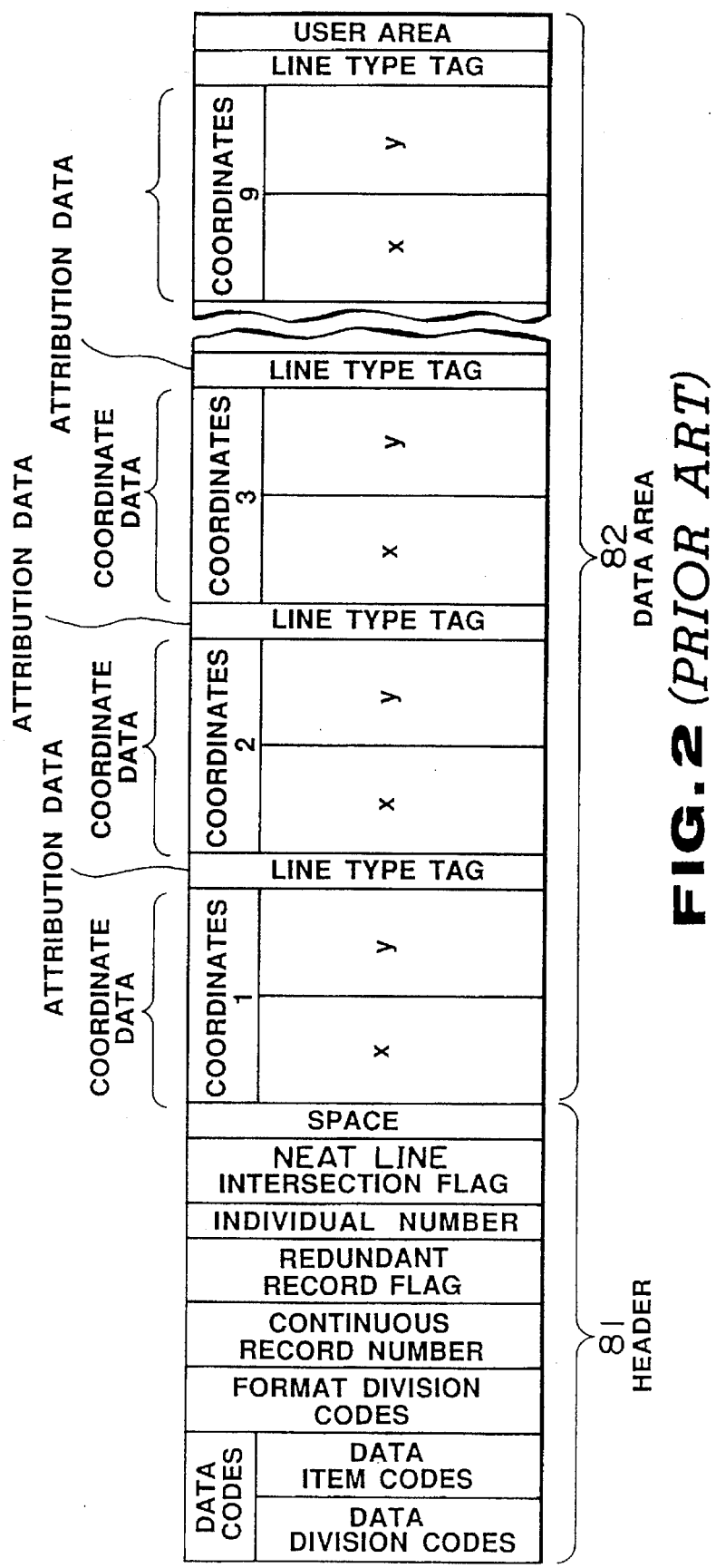
FIG. 2 is a diagram showing an example of a general data format of line data.
Figure 3:
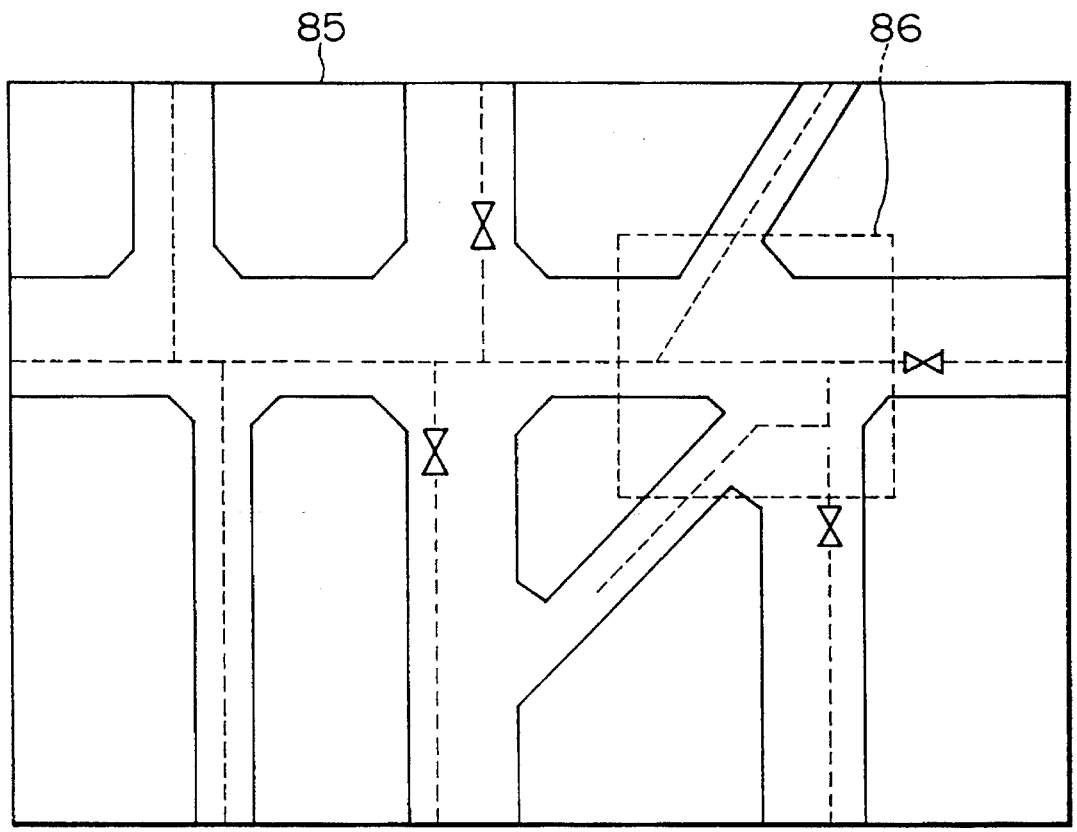
FIG. 3 is a diagram illustrating the relationship between an object map and an output domain.

This line data format is a revised version of that shown in FIG. 2. The header 31 is followed by a representative value area 32 recording the representative values consisting of the maximum values and minimum values which are obtained, for each coordinate axis, from the coordinates of the characteristic points on the line, which coordinates are stored in the following data area 33. For example, with regard to the line data of the line of FIG. 6, the coordinate data $(x_{13}, y_{11})$ and $(x_1, y_1)$ are recorded in the area 32 as the maximum values and minimum values, respectively.

Figure 8:
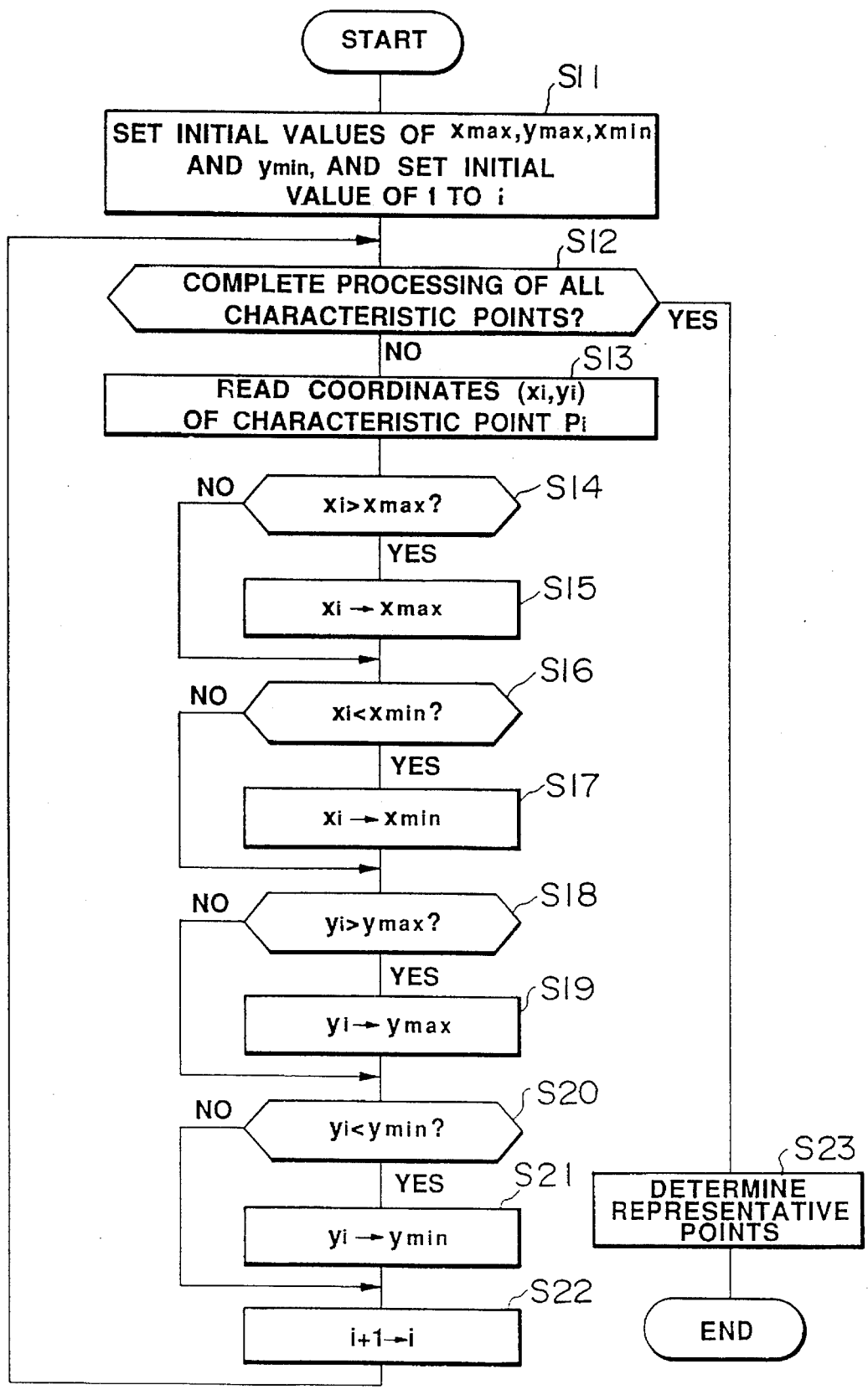
FIG. 8 is a flowchart showing the procedure for obtaining the representative values in the process for generating a coordinate data sequence to be transmitted to a terminal in the first embodiment.

FIG. 8 is a flowchart showing the steps for obtaining the representative values $(x_{max}, y_{max}, x_{min}, y_{min})$ in the process of forming the coordinate data array. The application program 5 performs the following steps on each line as a graphic element.

STEP S11: The application program 5 sets initial values of the representative values $x_{max}$, $y_{max}$, $x_{min}$ and $y_{min}$. For example, it sets the x- and y-coordinates of the bottom left vertex of the object map 1 as the initial values of the representative values $x_{max}$ and $y_{max}$, and the x- and y-coordinates of the top right vertex of the object map 1 as the initial values of the representative values $x_{min}$ and $y_{min}$. In addition, it substitutes "1" into i as the initial value of characteristic points to be processed, and then proceeds to the next step.

STEP S12: The application program 5 tests to determine whether processing of all the characteristic points on the line has been completed. If the answer is positive, it proceeds to step S23, whereas if the answer is negative, it proceeds to the next step.

STEP S13: The application program 5 reads the x- and y-coordinates of the characteristic point Pi, and proceeds to the next step.

STEP S14: The application program 5 tests to determine if the condition $x_i > x_{max}$ holds, and proceeds to the next step if the answer is positive, whereas it proceeds to step S16 if the answer is negative.

STEP S15: The application program 5 substitutes $x_i$ into $x_{max}$, and proceeds to the next step.

STEP S16: The application program 5 tests to determine if the condition $x_i < x_{min}$ holds, and proceeds to the next step if the answer is positive, whereas it proceeds to step S18 if the answer is negative.

STEP S17: The application program 5 substitutes $x_i$ into $x_{min}$, and proceeds to the next step.

STEP S18: The application program 5 tests to determine if the condition $y_i > y_{max}$ holds, and proceeds to the next step if the answer is positive, whereas it proceeds to step S20 if the answer is negative.

STEP S19: The application program 5 substitutes $y_i$ into $y_{max}$, and proceeds to the next step.

STEP S20: The application program 5 tests to determine if the condition $y_i < y_{min}$ holds, and proceeds to the next step if the answer is positive, whereas it proceeds to step S22 if the answer is negative.

STEP S21: The application program 5 substitutes $y_i$ into $y_{min}$, and proceeds to the next step.

STEP S22: The application program 5 increments the value i to i+1, and proceeds to step S12.

STEP S23: The application program 5 specifies the representative values $x_{max}$, $x_{min}$, $y_{max}$ and $y_{min}$.

Thus, the maximum values and minimum values for respective coordinate axes have been obtained. The sequence of each pair of steps S14 and S15, S16 and S17, S18 and S19, and S20 and S21 can be arbitrarily changed.

Figure 9:
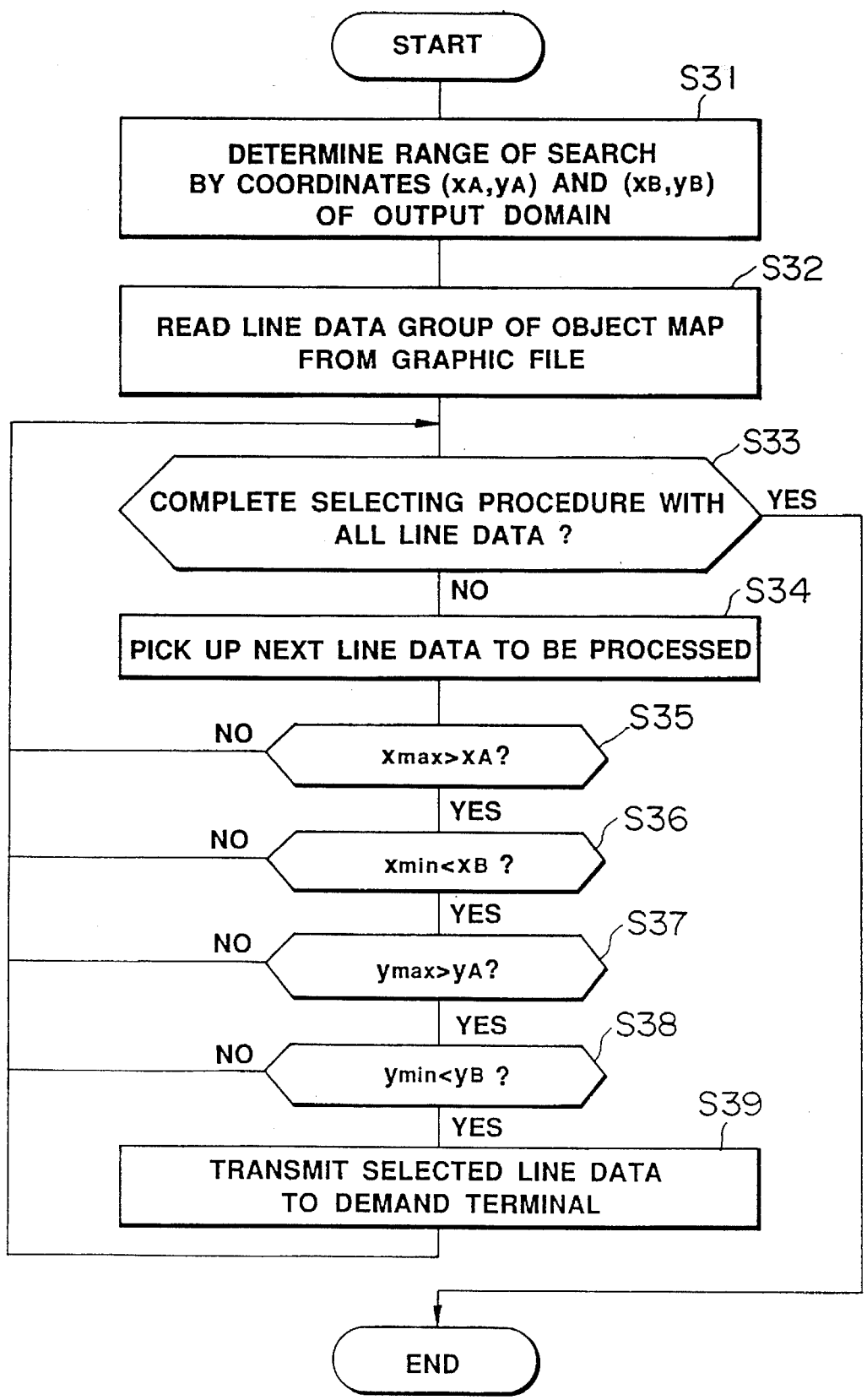
FIG. 9 is a flowchart showing the procedure for selecting line data to be transmitted to a terminal from the line data read out of a graphic file in the first embodiment.

FIG. 9 is a flowchart showing the steps for searching the line data group 3 retrieved from the graphic file 4 in order to select line data to be transmitted to the terminal.

STEP S31: The application program 5 specifies a range of search by using the setting points of the output domain 2 designated by an operator. For example, when a rectangular area is used as the output domain 2 as in a normal case, the x- and y-coordinates $(x_A, y_A)$ of its bottom left vertex, and the x- and y-coordinates $(x_B, y_B)$ of its top right vertex are used as the setting points of the output domain 2 (see, FIG. 4). After that, the application program 5 proceeds to the next step.

STEP S32: The application program 5 reads from the graphic file 4 the line data group 3 of the object map 1 designated by the terminal 6, and proceeds to the next step.

STEP S33: The application program 5 tests to determine whether the selection procedure, which selects the line data to be transmitted to the terminal, has been completed with regard to all the line data, and terminates the search if the answer is positive, whereas it proceeds to the next step if the answer is negative.

STEP S34: The application program 5 chooses from the line data group 3 the next line data to be subjected to the selection procedure, obtains the representative values $(x_{max}, y_{max}, x_{min}, y_{min})$ by using steps S11–S23 of FIG. 8, and proceeds to the next step.

STEP S35: The application program 5 tests to determine whether the condition $x_{max} > x_A$ holds, and proceeds to the next step if the answer is positive, whereas it returns to step S33 if the answer is negative.

STEP S36: The application program 5 tests to determine whether the condition $x_{min} < x_B$ holds, and proceeds to the next step if the answer is positive, whereas it returns to step S33 if the answer is negative.

STEP S37: The application program 5 tests to determine whether the condition $y_{max} > y_A$ holds, and proceeds to the next step if the answer is positive, whereas it returns to step S33 if the answer is negative.

STEP S38: The application program 5 tests to determine whether the condition $y_{min} < y_B$ holds, and proceeds to the next step if the answer is positive, whereas it returns to step S33 if the answer is negative.

STEP S39: The application program 5 transmits the line data to the terminal 6, and returns to step S33.

In such a way, the application program 5 selects only the line data associated with the output domain 2, which is designated by the operator, from the line data group 3 read from the graphic file 4. The sequence of the steps S35–S38 can be arbitrarily changed.

The method for searching line data of the first embodiment selects the line data which seems to be necessary for outputting the map within the output domain 2 from the line data group 3 associated with the object map 1. In other words, the application program 5 transmits the line data to the terminal 6 after removing the line data which is unnecessary for outputting the map in the output domain 2. As a result, the first embodiment can shorten the response time from the demand for outputting the map in the output domain 2 to the actual output thereof. In addition, it can reduce the memory capacity of the terminal.

In the first embodiment, however, the line data transmitted from the host computer to the terminal via a communication line may still include some unnecessary line data associated with characteristic points outside the output domain. For example, the line data includes the coordinates of the characteristic points $P_1$ and $P_3$ which are outside the output domain 2 in FIG. 4. Accordingly, there is still room for improvement in the first embodiment.

Therefore, a second embodiment of the present invention selects only the line data completely contained in the output domain 2 from the original line data constituting the object map 1, and transmits the selected data to the terminal. This will further reduce the load of the communication line, and speeds up the output processing of the map.

EMBODIMENT 2

Figure 10:
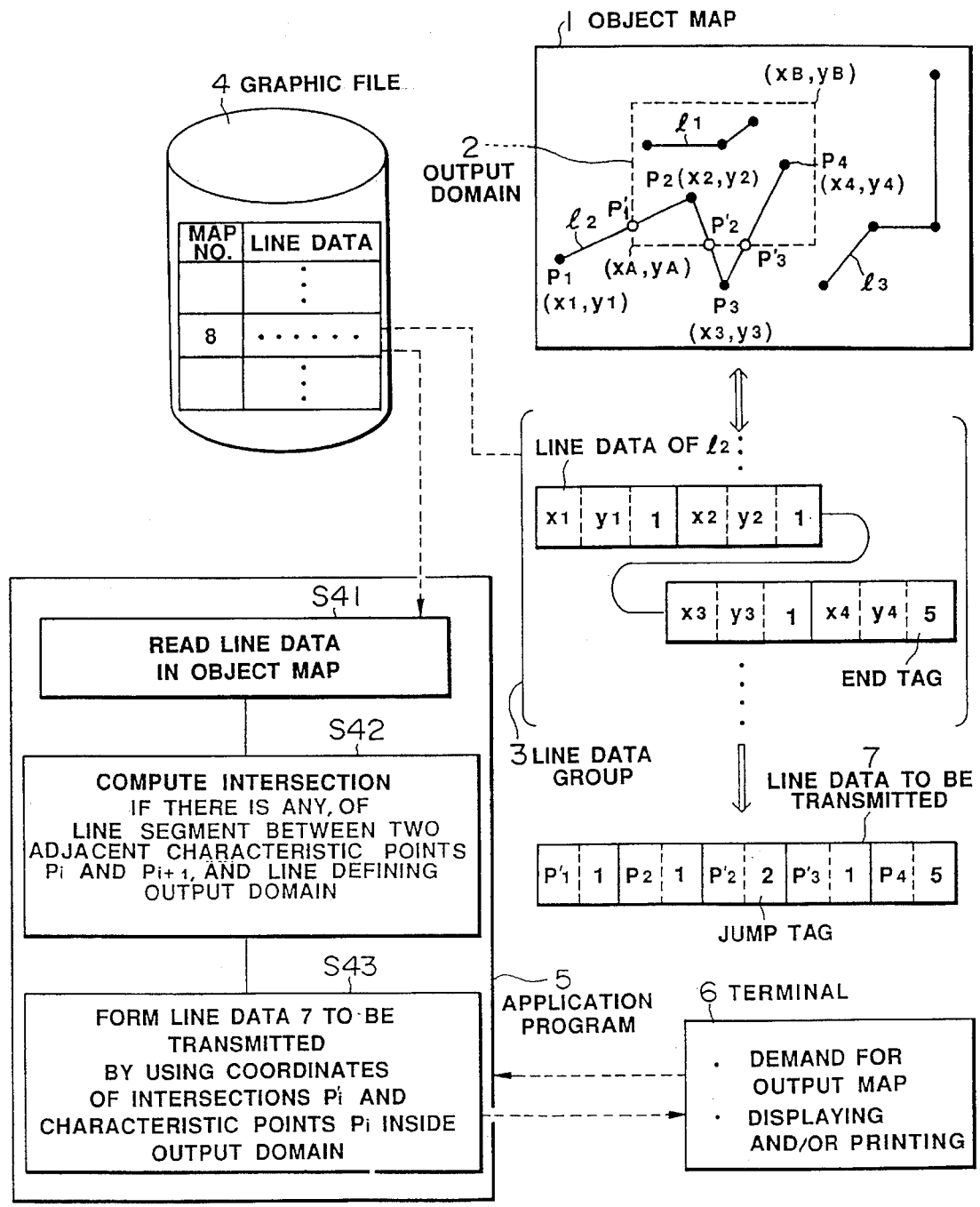
FIG. 10 is a block diagram showing the principle of a second embodiment of a method and apparatus for searching line data in a graphic data base system in accordance with the present invention.

FIG. 10 is a block diagram showing the principle of the second embodiment of the present invention.

In this figure, reference numerals 1–6 designate the corresponding elements to those of the first embodiment in FIG. 4, and a reference numeral 7 denotes the line data to be transmitted to the terminal 6. In addition, reference characters $l_1$–$l_3$ designate the lines as graphic elements and $P_1$–$P_4$ denote the characteristic points on the line $l_2$ as in the first embodiment.

Each of the line data 3 of the object map 1 retrieved from the graphic file 4 has been formed by sequentially arranging the coordinates from the first characteristic point to the last characteristic point of each line together with a line type tag indicating the type of the line segment to the next characteristic point, such as a solid straight line, a broken line, etc. The line type tag associated with the last characteristic point is the end tag whose value is "5" here.

The general flow of the application program 5 is as follows:

STEP S41: The application program 5 reads the line data group 3 of the object map 1 (for example, the map whose number is [8]) from the graphic file 4, and proceeds to the next step.

STEP S42: The application program 5 obtains the coordinates of an intersection $P_i'$ of the line segment between the two adjacent characteristic points $P_i$ and $P_{i+1}$ and a line defining the output domain 2, if there is any intersection of the two lines, and proceeds to the next step.

STEP S43: The application program 5 forms the line data 7 to be transmitted to the terminal by using the coordinates of the intersections $P_i'$ and the coordinates of the characteristic points $P_i$ inside the output domain 2, that is, by removing the coordinates of the characteristic points $P_i$ outside the output domain 2, and sends the line data 7 to the terminal.

There are two typical methods for obtaining the intersections $P_i'$ as follows:

(1) Computing the coordinates of an intersection of each line defining the output domain 2 and each line segment between two adjacent characteristic points on each of the lines $l_1$–$l_3$.

(2) Computing the coordinates of intersections by first setting a flag indicating for each characteristic point whether that point is inside or outside the output domain 2, and then, computing the coordinates of an intersection of each line defining the output domain 2 and each line segment joining two adjacent characteristic points whose flags have different values. Here, the flags of different values indicate that one characteristic point of the two adjacent points is outside the output domain 2, and the other characteristic point is inside the domain 2, and hence, the line segment joining the two characteristic points intersects with a line specifying the output domain 2.

Figure 11:
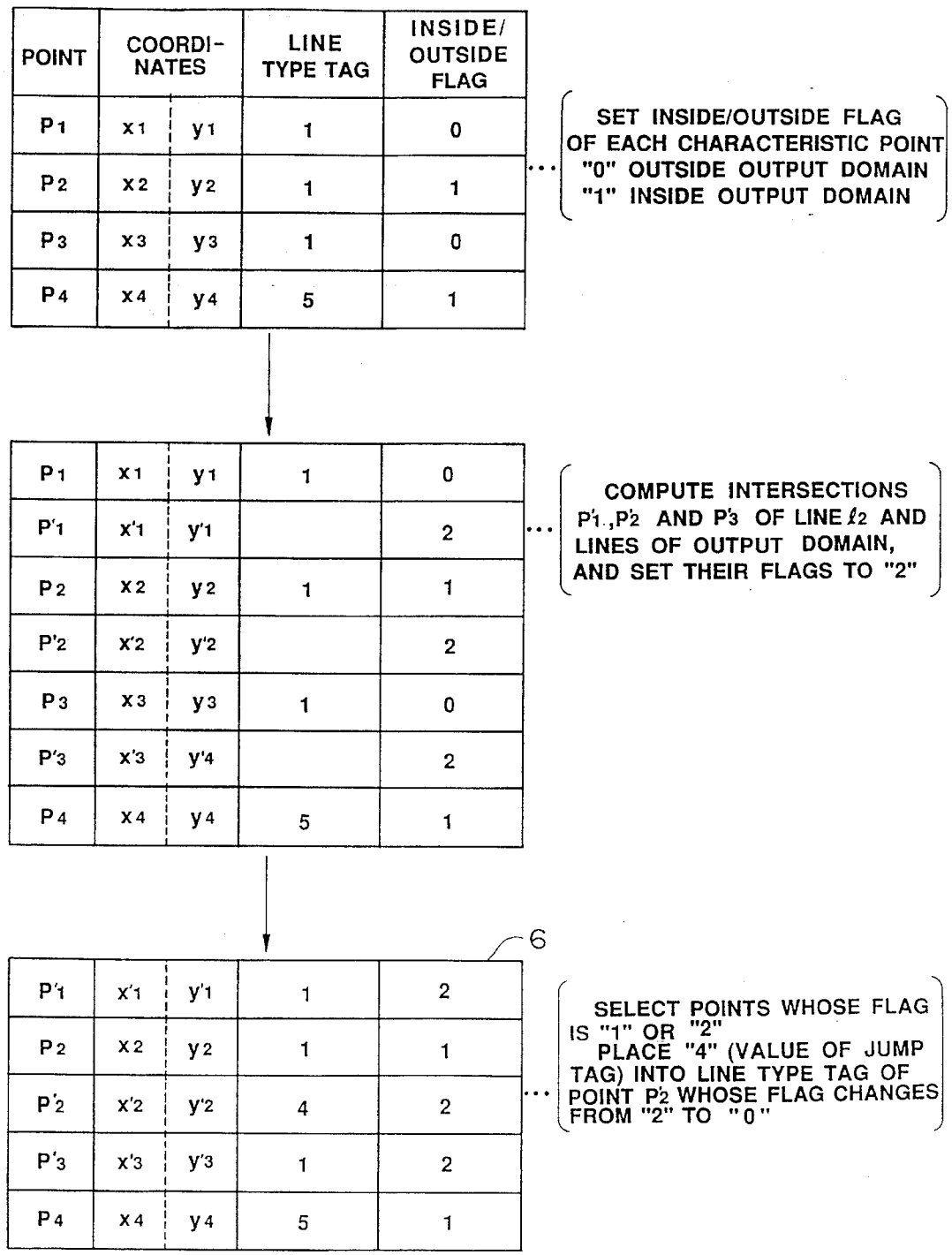
FIG. 11 is a diagram illustrating the process for obtaining the line data to be transmitted to a terminal from the original line data of a line $l_2$ of FIG. 10 in the second embodiment.

FIG. 11 is a diagram showing the process for obtaining the intersections $P_i'$ in accordance with the method (2) above. This figure illustrates an example of the process in which the line data 7 of the line $l_2$ is obtained from the original line data.

When a characteristic point is inside the output domain 2, its flag is set at "1"; and when it is outside the output domain 2, its flag is set at "0". In addition, the flag of the intersection $P_i'$ is set at "2". After that, the points whose flags are "1" and "2" are selected, and the intersection $P_i'$ whose flag is "2" and whose next flag is "0" is provided with the line type tag of "4" (called a jump tag), which indicates that the intersection $P_i$ jumps to the next intersection $P_{i+1}'$ skipping the characteristic point $P_{i+1}$. In FIG. 11, the intersection $P_2'$ meets this condition.

Using the jump tag of "4" is not essential. For example, transmitted line data 7 may be generated separately with regard to the line segment $P_1'$–$P_2$–$P_2'$, and the line segment $P_3'$–$P_4$.

Thus, this embodiment generates the line data 7 to be transmitted by selecting the coordinates of the characteristic points located inside the output domain 2 from those of the characteristic points on the lines $l_1$–$l_3$ associated with the line data to be handled, and by selecting the coordinates of the intersections of the lines $l_1$–$l_3$ and the lines defining the output domain 2. The data thus obtained consists of coordinates representing the line segments that appear only inside the output domain 2 among the lines $l_1$–$l_3$.

For example, with regard to the line $l_1$ whose entire characteristic points are contained in the output domain 2, all the coordinates of the characteristic points, which are read from the graphic file 4, are accepted as the line data 7 to be transmitted to the terminal. On the other hand, with regard to the line $l_2$, the coordinates of the intersections $P_1+$, $P_2'$ and $P_3'$ are calculated, and only the coordinates associated with the line segments formed by the points $P_1'$, $P_2$ and $P_2'$, and $P_3'$ and $P_4$ are selected as the line data 7 to be transmitted.

If the method for searching the line data proposed in the first embodiment is employed as a preprocessing of the second embodiment, a more effective search for the line data can be achieved. For example, selecting the line data possibly located inside the output domain 2 from the line data group 3 of the object map 1 in accordance with the first embodiment, and then applying the method for searching the line data in accordance with the second embodiment to the selected line data will make it possible to skip some steps such as steps S42 and S43 for the line $l_3$, thereby simplifying the processing.

The second embodiment will now be described in more detail referring to FIGS. 7, and 12–18.

FIG. 7 illustrates an example of the line data format employed in this embodiment. This line data format is identical to that employed in the first embodiment. The representative value area 32 is provided between the header 31 and data area 33 for containing the maximum values and minimum values, for respective coordinate axes (x- and y-coordinate axes), of the coordinates of the characteristic points on each line.

Figure 12:
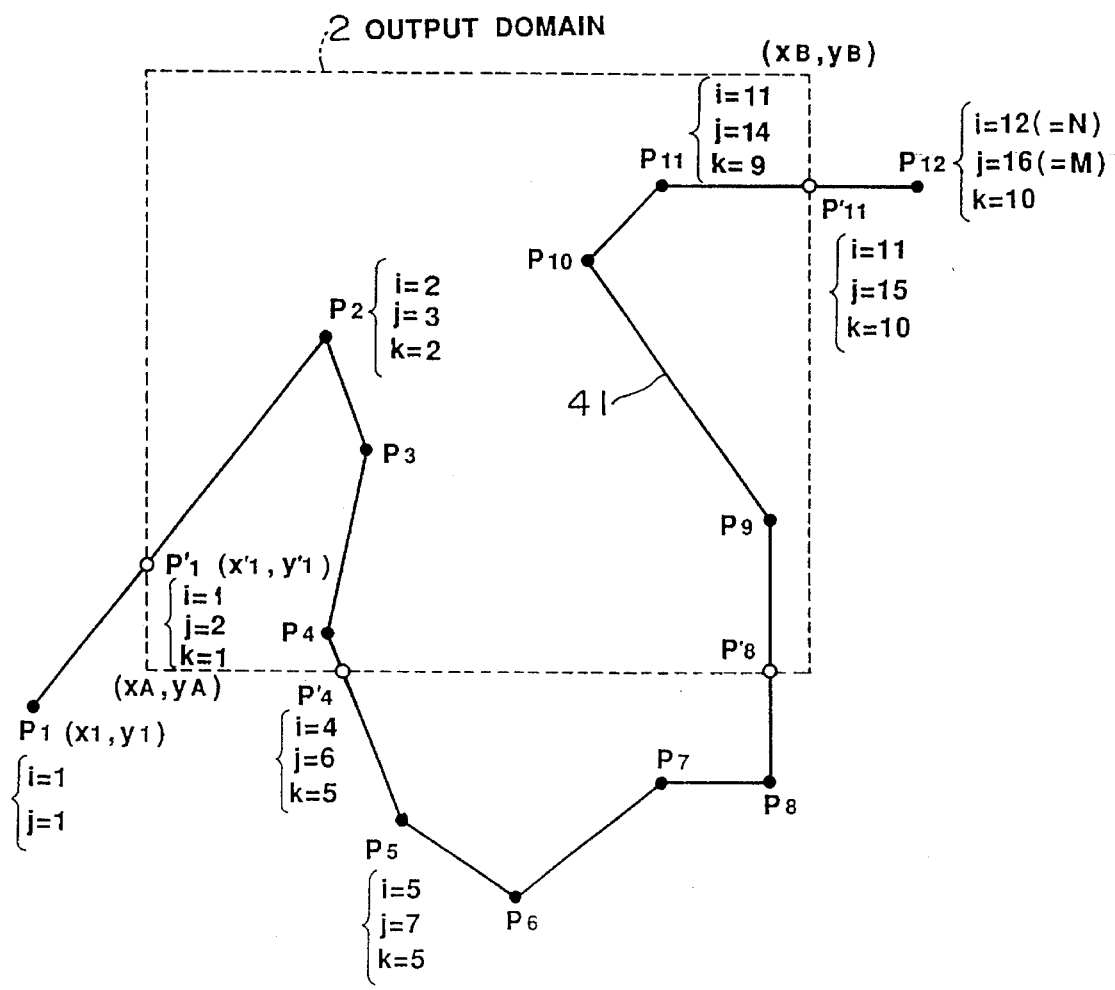
FIG. 12 is a diagram illustrating the relationship between a line as a graphic element and the output domain of the second embodiment.

FIG. 12 is a diagram illustrating the relationship between an arbitrarily given line 41 as a graphic element and the output domain 2. The line data of the line 41 is composed of the x- and y-coordinates of the characteristic points $P_1$–$P_{12}$ on the line, and the line type tags indicating the type of the line segments between two adjacent characteristic points, which are sequentially arranged. As the line type tag, tag "1" is affixed to the characteristic points $P_1$–$P_{11}$ to indicate each solid straight line, and the end tag of value "5" is attached to the characteristic point $P_{12}$ to indicate the end point.

Figure 13:
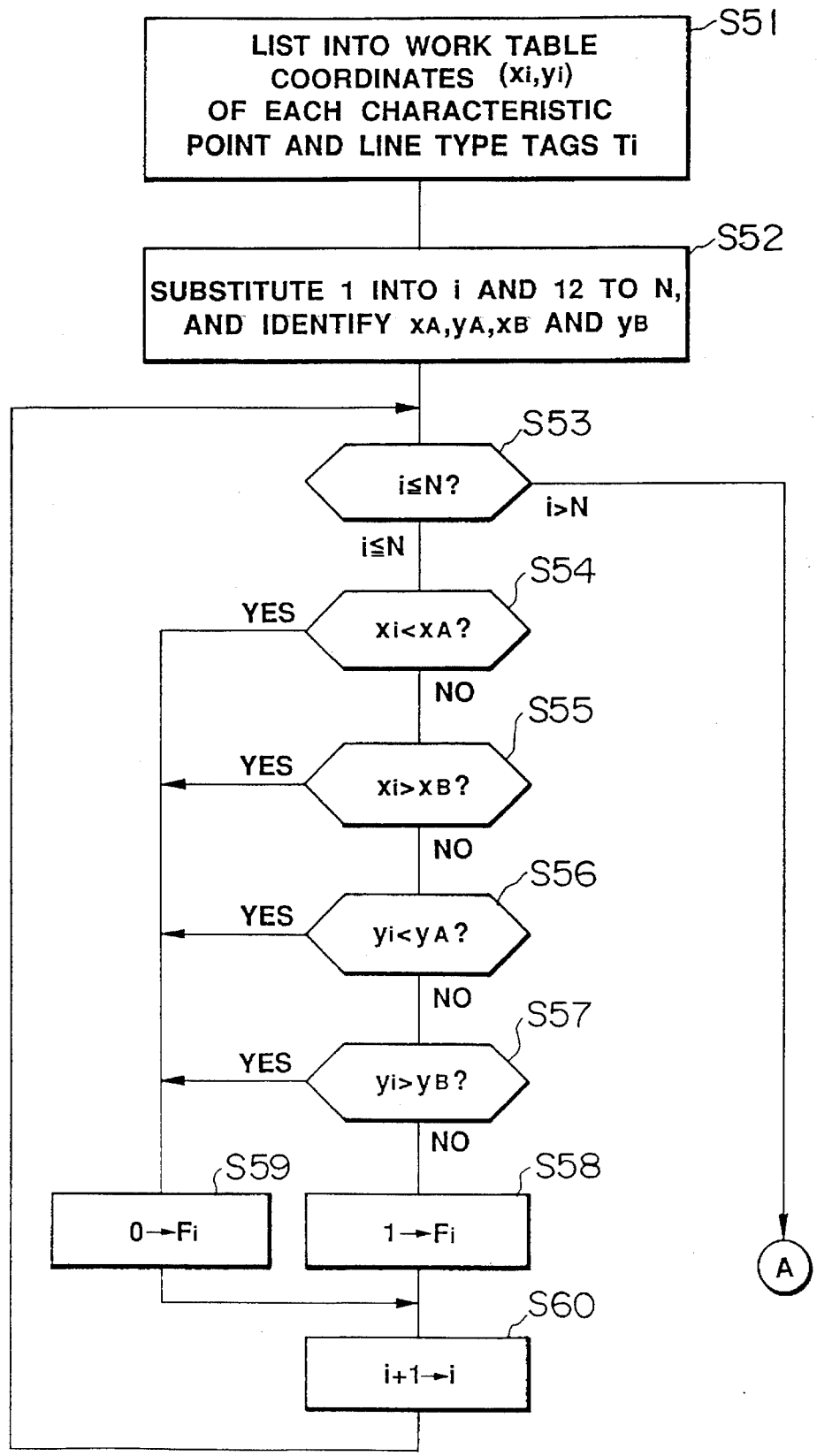
FIG. 13 is a flowchart showing the process for setting an inside/outside flag indicating whether each characteristic point is located inside or outside the output domain in the second embodiment.
Figure 14:
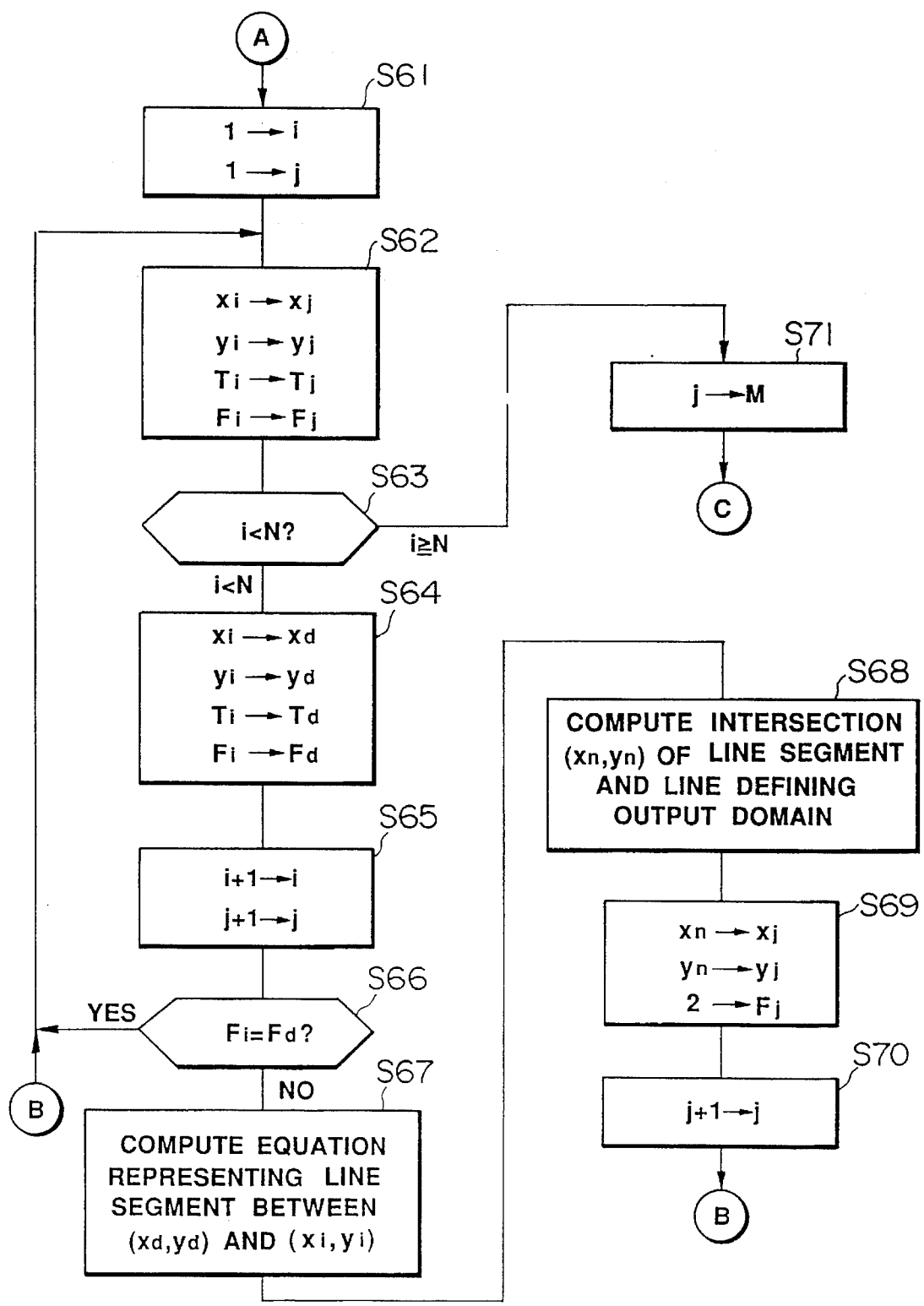
FIG. 14 is a flowchart showing the process for obtaining an intersection of a line segment connecting two adjacent characteristic points and a line defining the output domain in the second embodiment.
Figure 15:
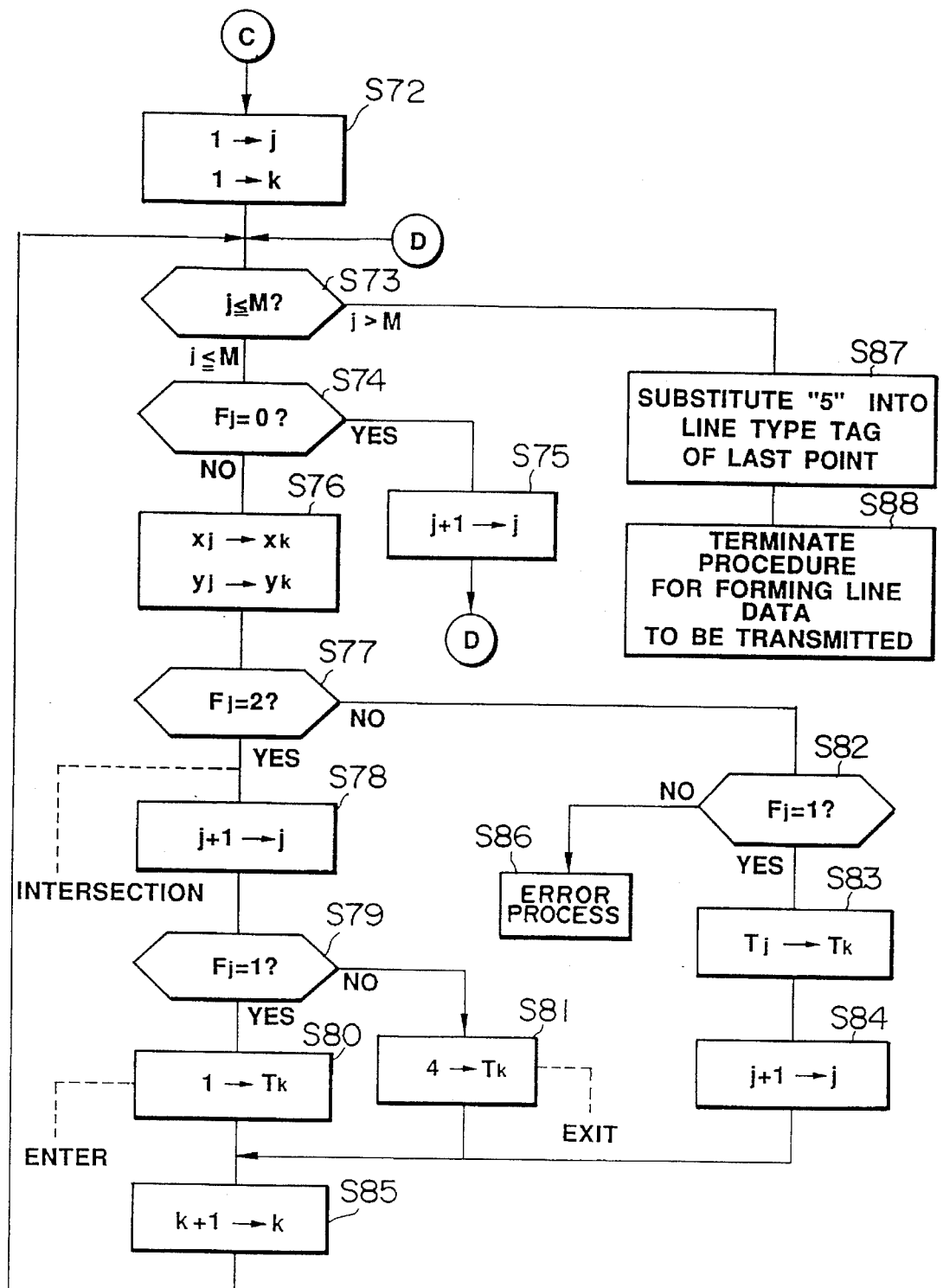
FIG. 15 is a flowchart showing the process for generating the line data to be transmitted to a terminal by using the intersections and characteristic points inside the output domain in the second embodiment.

FIGS. 13–15 are flowcharts showing the procedures for forming, from each line of the object map 1, the line data to be transmitted, which represents only the line segments inside the output domain 2 which is defined by an output demand for a map from the terminal 6. This embodiment exemplifies the formation of the line data 7 of the line 41 of FIG. 12 by using inside/outside flags.

FIG. 13 shows the steps of setting inside/outside flags indicating whether each characteristic point $P_i$ on the line 41 is located inside or outside the output domain 2; FIG. 14 is a flowchart illustrating the steps of obtaining the coordinates of an intersection, if there is any, of each line segment formed by two adjacent characteristic points and a line defining the output domain 2; and FIG. 15 is a flowchart showing the steps of forming the line data to be transmitted, which is composed of the intersections and the coordinates of the characteristic points inside the output domain 2. First, the inside/outside flags are set through the steps of FIG. 14.

STEP S51: The application program 5 lists the content of the data area 33 of the line data associated with the line 41 into a work table 51 of FIG. 16. The coordinates $(x_i, y_i)$ of each characteristic point $P_i$ and the line type tag Ti thereof are listed into the work table 51. After that, the application program 5 proceeds to the next step.

STEP S52: The application program 5 sets the initial values of i and N to 1 and 12, respectively, and identifies the coordinates $(x_A, y_A)$ and $(x_B, y_B)$ defining the output domain 2, and proceeds to the next step. Here, i is the sequential number of a characteristic point $P_i$ of interest, and N is the total number of the characteristic points $P_i$ (that is, the maximum value of i) as shown in FIGS. 12 and 16.

STEP S53: The application program 5 compares i and N, and proceeds to step S61 if i>N, and to the next step if i≦N.

STEP S54: The application program 5 tests to determine whether or not the condition $x_i<x_A$ is satisfied, and proceeds to step S59 if the answer is positive, whereas it proceeds to the next step if the answer is negative.

STEP S55: The application program 5 tests to determine whether or not the condition $x_i>x_B$ is satisfied, and proceeds to step. S59 if the answer is positive, whereas it proceeds to the next step if the answer is negative.

STEP S56: The application program 5 tests to determine whether or not the condition $y_i<y_A$ is satisfied, and proceeds to step S59 if the answer is positive, whereas it proceeds to the next step if the answer is negative.

STEP S57: The application program 5 tests to determine whether or not the condition $y_i>y_B$ is satisfied, and proceeds to step S59 if the answer is positive, whereas it proceeds to the next step if the answer is negative.

STEP S58: The application program 5 sets the inside/outside flag $F_i$ of the characteristic point $P_i$ to 1 indicating that the characteristic point $P_i$ is inside the output domain 2 as shown in FIG. 16, and proceeds to step S60.

STEP S59: The application program 5 sets the inside/outside flag $F_i$ of the characteristic point $P_i$ to 0 indicating that the characteristic point $P_i$ is outside the output domain 2 as shown in FIG. 16, and proceeds to step S60.

STEP S60: The application program 5 increments i to i+1, and returns to step S53.

After the inside/outside flags have been set in the work table 51, the coordinates of the intersections are calculated through the steps shown in FIG. 14.

STEP S61: The application program 5 sets 1 as the initial values of i and j, and proceeds to the next step. Here, j indicates the sequential number of the characteristic points plus the intersections as shown in FIGS. 12 and 17.

STEP S62: The application program 5 substitutes $x_i$, $y_i$, $T_i$ and $F_i$ into $x_j$, $y_j$, $T_j$ and $F_j$, and proceeds to the next step.

STEP S63: The application program 5 compares i and N, and proceeds to step S71 if i≧N, whereas it proceeds to the next step if i<N. Here, N indicates the total number of the characteristic points $P_i$ and is equal to 12 in this case as mentioned before.

STEP S64: The application program 5 substitutes $x_i$, $y_i$, $T_i$ and $F_i$ into $x_d$, $y_d$, $T_d$ and $F_d$, and proceeds to the next step.

STEP S65: The application program 5 increments i and j to i+1 and j+1, respectively, and proceeds to the next step.

STEP S66: The application program 5 tests to determine if $F_i=F_d$, and returns to step S62 if the answer is positive, whereas it proceeds to the next step if the answer is negative. This step is necessary as a preliminary step for checking whether there is any intersection of a line defining the output domain 2 and the line segment between the characteristic point of interest and the next characteristic point. If the answer of this step is negative, that is, if $F_i$ is not equal to $F_d$, there is an intersection between the two lines. This occurs with the characteristic points $P_1$, $P_4$, $P_8$ and $P_{11}$ of the line 41.

STEP S67: The application program 5 computes the equation representing the line segment between the two adjacent characteristic points $(x_d, y_d)$ and $(x_i, y_i)$, and proceeds to the next step. In computing the equation, the line type tag Td of the characteristic point $P_d$ is checked, and if $T_d=1$ (a solid straight line), the equation is expressed as follows:

$$(y-y_d)=(y_d-y_i)(x-x_d)/(x_d-x_i) \qquad (1)$$

STEP S68: The application program 5 computes the intersection $(x_n, y_n)$ of the line segment represented by equation (1) and the lines defining the output domain 2, one of which is represented by the following expression, for example, and proceeds to the next step.

$$y=y_A \text{ (in the range } x_A \leq x < x_B) \qquad (2)$$

$$x_n = (y_A - y_i)(x_d - x_i)/(y_d - y_i) \tag{3}$$

$$y_n = y_A \tag{4}$$

STEP S69: The application program 5 substitutes $x_n$, $y_n$ and 2 into $x_j$, $y_j$ and $F_j$ as shown on the line of $P_1'$ in FIG. 17, and proceeds to the next step. The flag of value 2 indicates that the line enters the output domain 2 at the coordinates ($x_n$, $y_n$) or exits from the output domain 2 at the coordinates. The tag $T_j$ in this case is null.

STEP S70: The application program 5 increments j to j+1, and returns to step S62.

STEP S71: The application program 5 substitutes j into M, and proceeds to the next step. Here, M represents the total number of data, that is, the maximum value of j, which is 16 in this case as shown in FIGS. 12 and 17.

After the data 52 of FIG. 17 including the intersections has been obtained, the line data to be transmitted to the terminal is formed in accordance with the steps shown in FIG. 15.

STEP S72: The application program 5 sets the initial values of j and k at 1. Here, k indicates the sequential number of the characteristic points in the output domain 2 plus the intersect ions.

STEP S73: The application program 5 compares j and M, and proceeds to step S87 if j>M, whereas it proceeds to the next step if j≦M.

STEP S74: The application program 5 tests to determine if $F_j=0$, and proceeds to the next step if the answer is positive, and to step S76 if the answer is negative. In the case where the answer is positive, the characteristic point $P_j$ associated with the flag $F_j$ is located outside the output domain 2, and hence, it is unnecessary to pick up the coordinates of the point $P_j$ as the line data to be transmitted.

STEP S75: The application program 5 increments j to j+1, and returns to step S73.

STEP S76: The application program 5 substitutes $x_j$ and $y_j$ into $x_k$ and $y_k$, and proceeds to the next step.

STEP S77: The application program 5 tests to determine if $F_j=2$, and proceeds to the next step if the answer is positive, whereas it proceeds to step S82 if the answer is negative. Here, the positive answer indicates that the coordinates ($x_j$, $y_j$) of the point associated with the flag $F_j$ is the intersection of the line 41 and a line specifying the output domain 2 as shown in FIG. 17.

STEP S78: The application program 5 increments j to j+1, and proceeds to the next step.

STEP S79: The application program 5 tests to determine if $F_j=1$, and proceeds to the next step if the answer is positive, and to step S81 if the answer is negative. In the case where the answer is positive, the characteristic point $P_j$ next to the intersection obtained at step S77 is located inside the output domain 2. For example, the line 41 enters the output domain 2 through the intersections such as $P_1'$ and $P_8'$ of FIG. 12 towards the next characteristic points such as $P_2$ and $P_9$. Accordingly, the line segments following such intersections must be picked up as the line data to be transmitted. On the other hand, in the case where the answer is negative, it is not necessary to pick up, as the line data to be transmitted, the line segment between the intersection and the next characteristic point such as that between the intersection $P_4'$ and the next characteristic point $P_5$.

Figure 18:
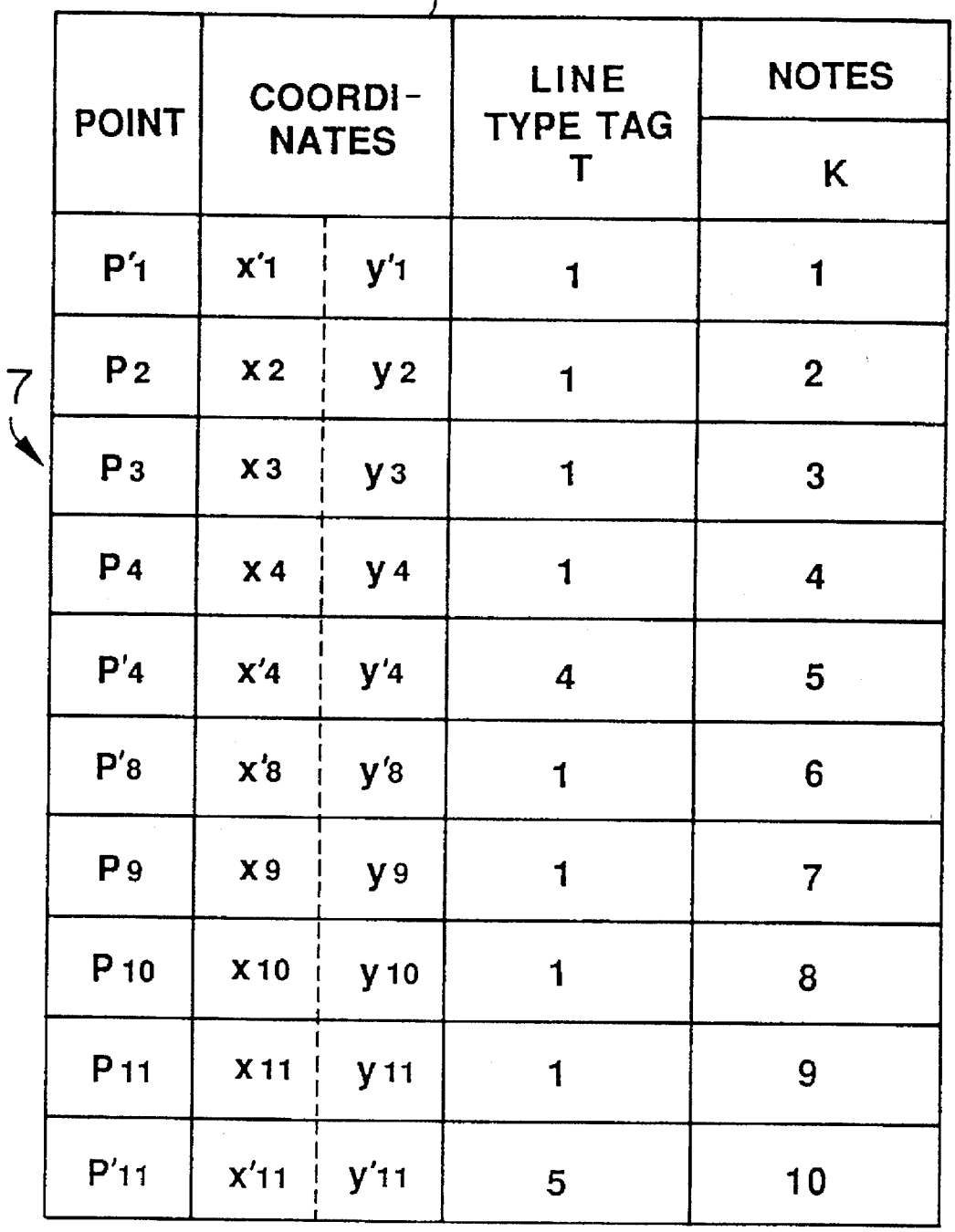
FIG. 18 is a diagram illustrating the line data to be transmitted to a terminal, when the process of FIG. 15 is completed.

STEP S80: The application program 5 set the line type tag $T_k$ to 1, and proceeds to step S85. By thus setting the line type tag $T_k$, the intersections $P_i'$ and $P_8'$ are picked up as shown in FIG. 18.

STEP S81: The application program 5 sets the line type tag $T_k$ to 4, and proceeds to step S85. This indicates that the line segment exits out of the output domain 2 at this intersection such as the line segment between the intersection $P_4'$ and the characteristic point Ps, and hence, the line data to be transmitted jumps to the next intersection like $P_8'$ as shown in FIG. 18.

STEP S82: The application program 5 tests to determine if $F_j=1$, and proceeds to the next step if the answer is positive, and to step S86 if the answer is negative. In the case where the answer is positive, the characteristic point $P_j$ associated with the flag $F_j$ is located inside the output domain 2, and hence, it must be picked up as the line data to be transmitted.

STEP S83: The application program 5 substitutes $T_j$ into $T_k$, and proceeds to the next step.

STEP S84: The application program 5 increments j to j+1, and proceeds to the next step.

STEP S85: The application program 5 increments k to k+1, and returns to step S73.

STEP S86: The application program 5 judges that an error occurs, and stops the formation of the line data to be transmitted.

STEP S87: The application program 5 checks if the line type tag of the last point of the line data to be transmitted which has been obtained takes a value of 5. If it is not 5, the application program 5 sets it to 5, and proceeds to the next step. Without this step, the line type tag of the last point $P_{11}'$ of the line data to be transmitted may remain at 4, which is the value of the jump tag which has been set at step S81. For example, since the last characteristic point $P_{12}$ of the line 41 is located outside the output domain 2, and the inside/outside flag thereof is 0, the line type tag $T_k$ of the last point $P_{11}'$ has been set at 4. Thus, this processing is to ensure that the last tag is set at 5, which otherwise may remain at 4.

STEP S88: The application program completes the formation of the line data to be transmitted to the terminal.

The above described steps S51–S88 are performed on each line of the object map, or on each line selected by the method of the first embodiments. Thus, the line data 7 to be transmitted has been formed in a work table 53 as shown in FIG. 18.

When steps S51–S88 are performed on each line selected by the method of the first embodiment, the line data associated with a line which is completely included in the output domain 2 may be selected after the procedure of FIG. 9 has been completed and before the procedure of FIG. 13 is started.

In this case, the line data whose minimum values $X_{min}$ and $Y_{min}$ and whose maximum values $X_{max}$ and $Y_{max}$ satisfy the following conditions is selected beforehand as the data to be transmitted to the terminal.

$$X_{min} \geq X_A,$$

$$Y_{min} \geq Y_A,$$

$$X_{max} \leq X_B, \text{ and}$$

$$Y_{max} \leq Y_B.$$

After this procedure has been completed with regard to all the line data, the procedure of FIG. 13 is started. Thus, the time for carrying out the procedure of FIG. 13 will be shortened.

Although in the procedures of FIGS. 13–15, three work tables of a similar style, which are arranged in terms of i, j and k, are employed to execute the procedures, the same results can also be obtained by replacing the arrangement of the data in a single work table.

FIGS. 16–18 illustrate the contents of the work tables 51–53 when the procedures of FIGS. 13–15 have been completed, respectively. Here, the line type tag T and the inside/outside flag F indicate the following:

T=1 indicates that the line segment from the characteristic point associated with this tag to the next characteristic point consists of a solid straight line.

T=4 indicates that the characteristic point or intersection associated with this tag jumps to the next characteristic point or intersection.

T=5 indicates that the line data terminates at the characteristic point or intersection associated with the tag.

F=0 indicates that the characteristic point associated with the flag is located outside the output domain 2.

F=1 indicates that the characteristic point associated with the flag is located inside the output domain 2.

F=2 indicates that the point associated with the flag is an intersection of the line 41 and the line specifying the output domain 2.

EMBODIMENT 3

Although the intersections of the lines defining the output domain 2 and the line segments between two adjacent characteristic points are computed in the second embodiment, it is not essential.

Figure 19:
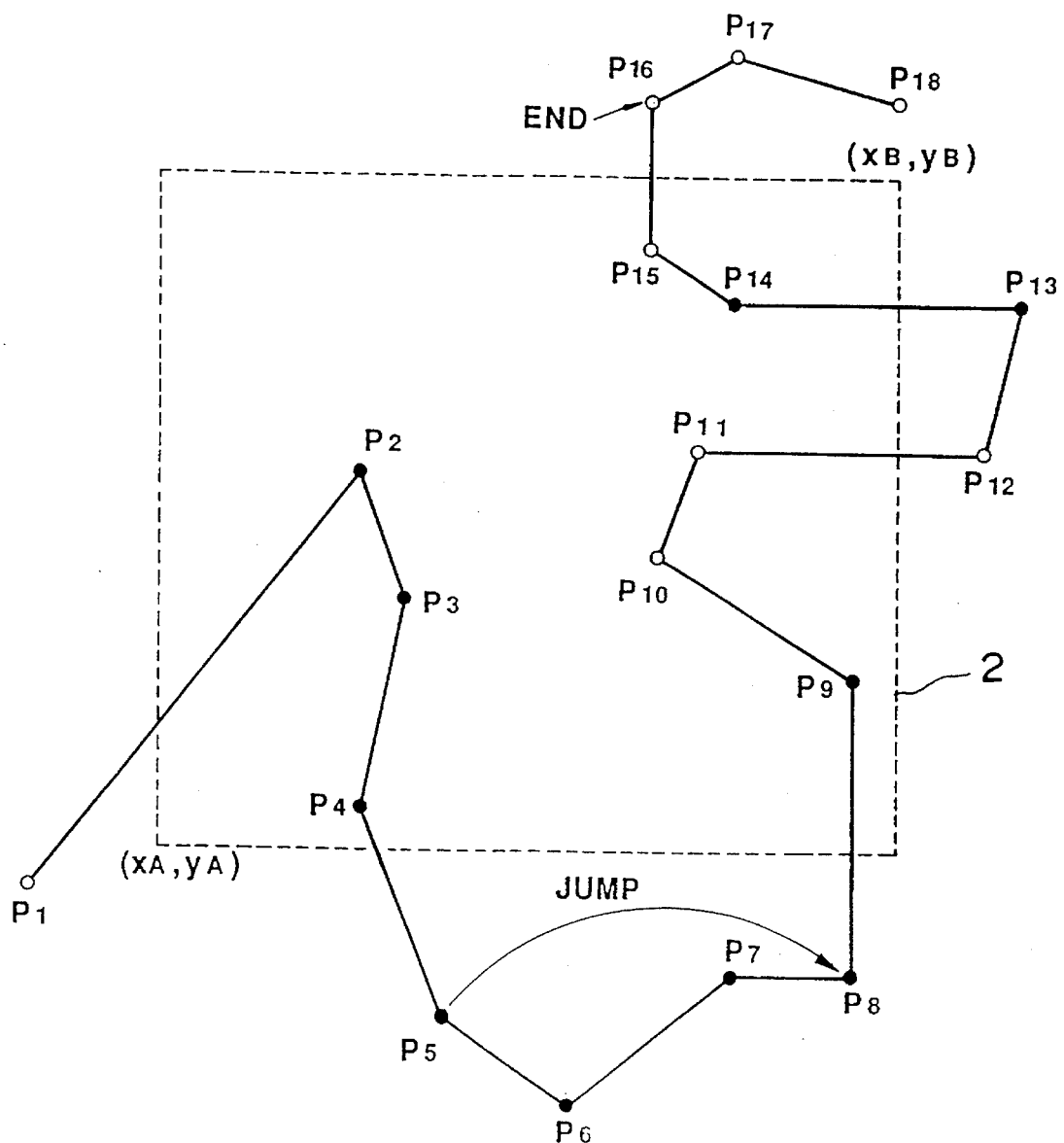
FIG. 19 is a diagram illustrating the relationship between a line and the output domain to explain the method of a third embodiment.

FIG. 19 illustrates another method for selecting the data to be transmitted to the terminal. In this method, the following characteristic points are selected: first, the characteristic points inside the output domain 2; and second, the characteristic points which are outside the output domain 2 and which are immediately adjacent to one of the characteristic points inside the output domain 2. For example, characteristic points $P_2$, $P_3$, $P_4$, $P_9$, $P_{10}$, $P_{11}$, $P_{14}$ and $P_{15}$ are selected because they are inside the output domain 2. Characteristic points $P_1$, $P_5$, $P_8$, $P_{12}$, $P_{13}$ and $P_{16}$ are selected because they are immediately joined to the characteristic points inside the output domain 2. In contrast with this, the remaining characteristic points $P_6$, $P_7$, $P_{17}$ and $P_{18}$ are removed because they are not inside the output domain 2, and they are not joined directly to the characteristic points inside the output domain 2. As a result, the data to be transmitted to the terminal jumps from the characteristic point $P_5$ to the characteristic point $P_8$.

Figure 20:
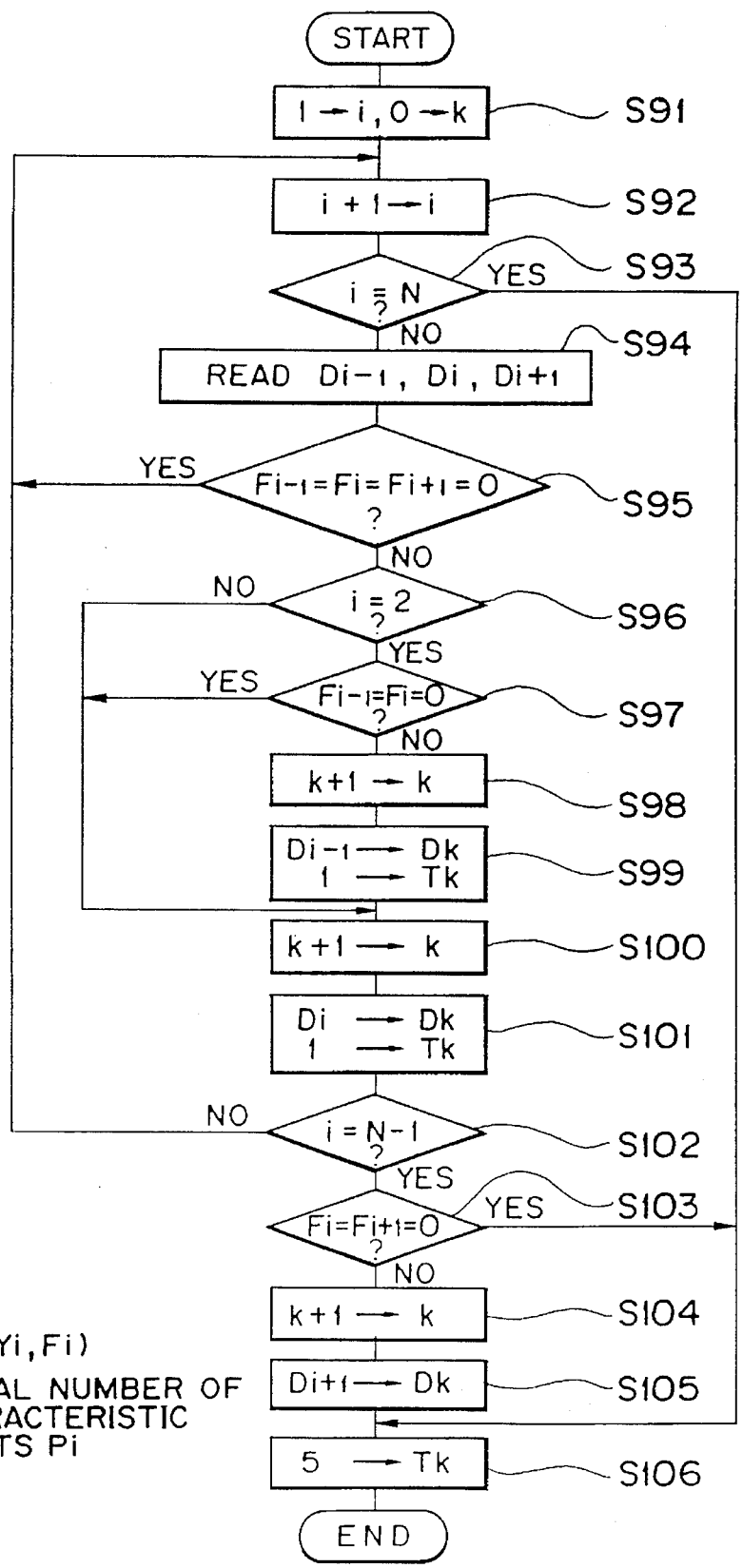
FIG. 20 is a flowchart showing a process of the third embodiment.

FIG. 20 is a flowchart illustrating the process of this method. This process is executed on the basis of data table 54 in FIG. 21, which has been prepared by the process as shown in FIG. 13. At this point, the inside/outside flag $F_i$ and the line type tag $T_i$ have been set for each characteristic point $P_i$. Specifically, the flag $F_i$ of each characteristic point $P_i$ has been set at 1 if it is inside the output domain 2, whereas it has been set at 0 if it is outside the output domain 2. In addition, the line type tag $T_i$ of each characteristic point $P_i$ is set at 1 unless it is the last characteristic point $P_N$ (=$P_{18}$) whose tag $T_N$ is set at 5.

In the flowchart of FIG. 20, the character i indicates the sequential number of the characteristic points, and the character k indicates the sequential number of characteristic points selected to be transmitted to the terminal.

In this flowchart, three data $D_{i-1}$ (=$x_{i-1}$, $y_{i-1}$, $F_{i-1}$), $D_i$ (=$x_i$, $y_i$, $F_i$) and $D_{i+1}$ (=$x_{i+1}$, $y_{i+1}$, $F_{i+1}$), which are associated with three consecutive characteristic points $P_{i-1}$, $P_i$ and $P_{i+1}$, are read from the data table 54 of FIG. 21, and their flags $F_{i-1}$, $F_i$ and $F_{i+1}$ are tested at step S95. If the flags $F_{i-1}$=$F_i$=$F_{i+1}$=0, all the three characteristic points are outside the output domain 2. Hence, the intermediate data $D_i$ is not selected as the data to be transmitted to the terminal. This processing is carried out at steps S92–S95. On the other hand, if $F_{i-1}$=$F_i$=$F_{i+1}$=0 does not hold, that is, if at least one of the flags $F_{i-1}$, $F_i$ and $F_{i+1}$ is 1, the intermediate data $D_i$ is picked up as the data to be transmitted to the terminal. This is because at least one of the three characteristic points $P_{i-1}$, $P_i$ and $P_{i+1}$ is inside the output domain 2 in this case. This rule is applicable for i=2 to i=N–1, and this processing is executed at steps S100 and S101.

The first end point $P_1$ and the last end point $P_N$ (N=18 in this case) must be handled as exceptions. When i=2, the data $D_{i-1}$ (=$D_1$) is picked up unless $F_{i-1}$=$F_i$=0, because at least one of the characteristic points $P_1$ and $P_2$ is inside the output domain 2 in this case. This processing is executed at steps S96–S99. When i=N–1, the data $D_{i+1}$ (=$D_N$) is picked up unless $F_i$=$F_{i+1}$=0, because at least one of the characteristic points $P_{N-1}$ and $P_N$ is inside the output domain 2 in this case. This processing is executed at steps S102–S106. Thus, the data to be transmitted to the terminal is determined.

Each of the steps in the flowchart of FIG. 20 will be explained in more detail.

At step S91, characters i and k are initialized to 1 and 0, respectively. After that, i is incremented at step S92, and is compared with N at step S93. Here, N is the total number of the characteristic points. If i=N, the characteristic point to be processed has been completed, and the processing jumps to step S106. Otherwise, the three data $D_{i-1}$, $D_i$ and $D_{i+1}$ are read from the data table 54 at step S94.

When the three consecutive data $D_{i-1}$, $D_i$ and $D_{i+1}$ have been read, the flags $F_{i-1}$, $F_i$ and $F_{i+1}$ are tested at step S95 if the condition $F_{i-1}$=$F_i$=$F_{i+1}$=0 is satisfied. If the answer is positive, the processing returns to step S92 to process the next data. In contrast, if the answer is negative, the processing proceeds to the next step S96 to handle the data $D_i$ of the first characteristic point $P_i$.

At step S96, i is tested if it is 2. If i=2, the flags $F_{i-1}$ (=$F_1$) and $F_i$ (=$F_2$) are tested if the condition $F_{i-1}$=$F_i$=0 is satisfied at step S97. If the answer is positive, the processing jumps to step S100, whereas if it is negative the processing proceeds to the next step S98. After k is incremented at step S98, the data $D_{i-1}$ is stored into the k-th line $D_k$ of a data table 55 shown in FIG. 22, and the tag $T_k$ is set to 1 at step S101. Thus, the data $D_1$ associated with the first characteristic point $P_1$ is picked up as the data to be transmitted to the terminal provided at least one of the characteristic points $P_1$ and $P_2$ is inside the output domain 2. After that, the intermediate data $D_i$ is stored into the data table 55. Specifically, after k is incremented at step S100, the data $D_i$ is stored into the k-th line of the data table 55 at step S101. In addition, the tag $T_k$ is set to 1.

At step S102, i is tested if it is N–1. If i=N–1, the flags $F_i$ (=$F_{N-1}$) and $F_{i+1}$ (=$F_N$) are tested at step S103 if the condition $F_i$=$F_{i+1}$=0 is satisfied. If the answer is positive, processing jumps to step S106, whereas if it is negative, the processing proceeds to the next step S104. After k is incremented at step S104, the data $D_{i+1}$ is stored into the k-th line $D_k$ of the data table 55. In this case, the tag $T_k$ is set to 5 at step S106 to indicate that the data to be transmitted to the terminal is completed at this line. Thus, the data $D_N$ associated with the last end point $P_N$ is picked up as the data to be transmitted to the terminal provided at least one of the characteristic points $P_{N-1}$ and $P_N$ is inside the output domain 2. If i equals N at step S93, the line type flag $T_k$ is set to 5 at step S106, and the procedure terminates.

The procedure from step S91 to S106 is repeated on all the line of the object map 1 so that the data to be transmitted to the terminal is determined.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A computer program product for use with a line data search system having a host computer and a terminal which is capable of communicating with the host computer, said host computer including a graphic file storing a plurality of line segments each of which is formed by arranging coordinates of characteristic points defining said line segments sequentially, said computer program product comprising:

first computer readable program code means for causing said host computer to read first line data representing a set of said line segments included in an object map from the graphic file;

second computer readable program code means for causing said host computer to store coordinates of setting points defining a rectangular output domain which is arbitrarily set in said object map;

third computer readable program code means for causing said host computer to obtain, for each of said first line data, maximum values and minimum values of said characteristic points constituting said first line data, each said maximum value and minimum value being obtained for each coordinate axis of said coordinates, thereby obtaining a rectangle defined by said maximum and minimum values;

fourth computer readable program code means for causing said host computer to compare each of said maximum values and minimum values with coordinates of said setting points to determine whether said rectangular output domain overlaps with said rectangle;

fifth computer readable program code means for causing said host computer to select said first line data associated with the rectangle which overlaps with said rectangular output domain as second line data;

sixth computer readable program code means for causing said host computer to transmit said second line data to an external terminal; and a storing medium usable by said host computer and storing said first to sixth computer readable program code means.

* * * * *